United States Patent
Baronne et al.

(10) Patent No.: US 12,197,351 B2
(45) Date of Patent: *Jan. 14, 2025

(54) METHODS AND SYSTEMS FOR REQUESTING ATOMIC OPERATIONS IN A COMPUTING SYSTEM

(71) Applicant: Micron Technology, Inc., Boise, ID (US)

(72) Inventors: Christopher Baronne, Allen, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 216 days.

This patent is subject to a terminal disclaimer.

(21) Appl. No.: 17/813,780

(22) Filed: Jul. 20, 2022

(65) Prior Publication Data

US 2024/0028526 A1 Jan. 25, 2024

(51) Int. Cl.
G06F 13/16 (2006.01)
G06F 13/40 (2006.01)

(52) U.S. Cl.
CPC ...... *G06F 13/1668* (2013.01); *G06F 13/4027* (2013.01)

(58) Field of Classification Search
CPC .................. G06G 13/1668; G06G 13/4027
See application file for complete search history.

(56) References Cited

U.S. PATENT DOCUMENTS

| | | | |
|---|---|---|---|
| 8,122,229 B2 | 2/2012 | Wallach et al. | |
| 8,156,307 B2 | 4/2012 | Wallach et al. | |
| 8,205,066 B2 | 6/2012 | Brewer et al. | |
| 8,423,745 B1 | 4/2013 | Brewer | |
| 8,561,037 B2 | 10/2013 | Brewer et al. | |
| 9,710,384 B2 * | 7/2017 | Wallach | G06F 12/1027 |
| 10,990,391 B2 | 4/2021 | Brewer | |
| 10,990,392 B2 | 4/2021 | Brewer | |

(Continued)

FOREIGN PATENT DOCUMENTS

| | | |
|---|---|---|
| CN | 117435545 | 1/2024 |
| WO | 2010051167 | 5/2010 |

(Continued)

*Primary Examiner* — Henry Tsai
*Assistant Examiner* — Christopher A Daley
(74) *Attorney, Agent, or Firm* — Schwegman Lundberg & Woessner, P.A.

(57) ABSTRACT

Various examples are directed to systems and methods for requesting an atomic operation. A first hardware compute element may send a first request via a network structure, where the first request comprises an atomic opcode indicating an atomic operation to be performed by a second hardware compute element. The network structure may provide an address bus from the first hardware compute element for providing the atomic opcode to the second hardware compute element. The second hardware compute element may execute the atomic operation and send confirmation data indicating completion of the atomic operation. The network structure may provide a second bus from the second hardware compute element and the first hardware compute element. The second bus may be for providing the confirmation data from the second hardware compute element to the first hardware compute element.

20 Claims, 15 Drawing Sheets

(56) References Cited

U.S. PATENT DOCUMENTS

| | | | |
|---|---|---|---|
| 2008/0270708 A1 | 10/2008 | Warner et al. | |
| 2012/0079177 A1* | 3/2012 | Brewer | G06F 12/0607 711/127 |
| 2013/0332711 A1 | 12/2013 | Leidel et al. | |
| 2014/0025920 A1* | 1/2014 | Stark | G06F 9/3004 711/206 |
| 2015/0143350 A1 | 5/2015 | Brewer | |
| 2015/0206561 A1 | 7/2015 | Brewer et al. | |
| 2019/0042214 A1 | 2/2019 | Brewer | |
| 2019/0171604 A1* | 6/2019 | Brewer | G06F 15/80 |
| 2019/0243700 A1 | 8/2019 | Brewer | |
| 2019/0303154 A1 | 10/2019 | Brewer | |
| 2019/0324928 A1 | 10/2019 | Brewer | |
| 2019/0340019 A1 | 11/2019 | Brewer | |
| 2019/0340020 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2021/0055964 A1 | 2/2021 | Brewer | |
| 2021/0064374 A1 | 3/2021 | Brewer | |
| 2021/0064435 A1 | 3/2021 | Brewer | |
| 2021/0149600 A1 | 5/2021 | Brewer | |
| 2024/0028390 A1* | 1/2024 | Baronne | G06F 9/505 |

FOREIGN PATENT DOCUMENTS

| | | |
|---|---|---|
| WO | 2013184380 | 12/2013 |
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

\* cited by examiner

METHODS AND SYSTEMS FOR REQUESTING ATOMIC OPERATIONS IN A COMPUTING SYSTEM

STATEMENT REGARDING FEDERALLY SPONSORED RESEARCH OR DEVELOPMENT

This invention was made with government support under DE-NA0003525 awarded by the United States Department of Energy. The government has certain rights in the invention.

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
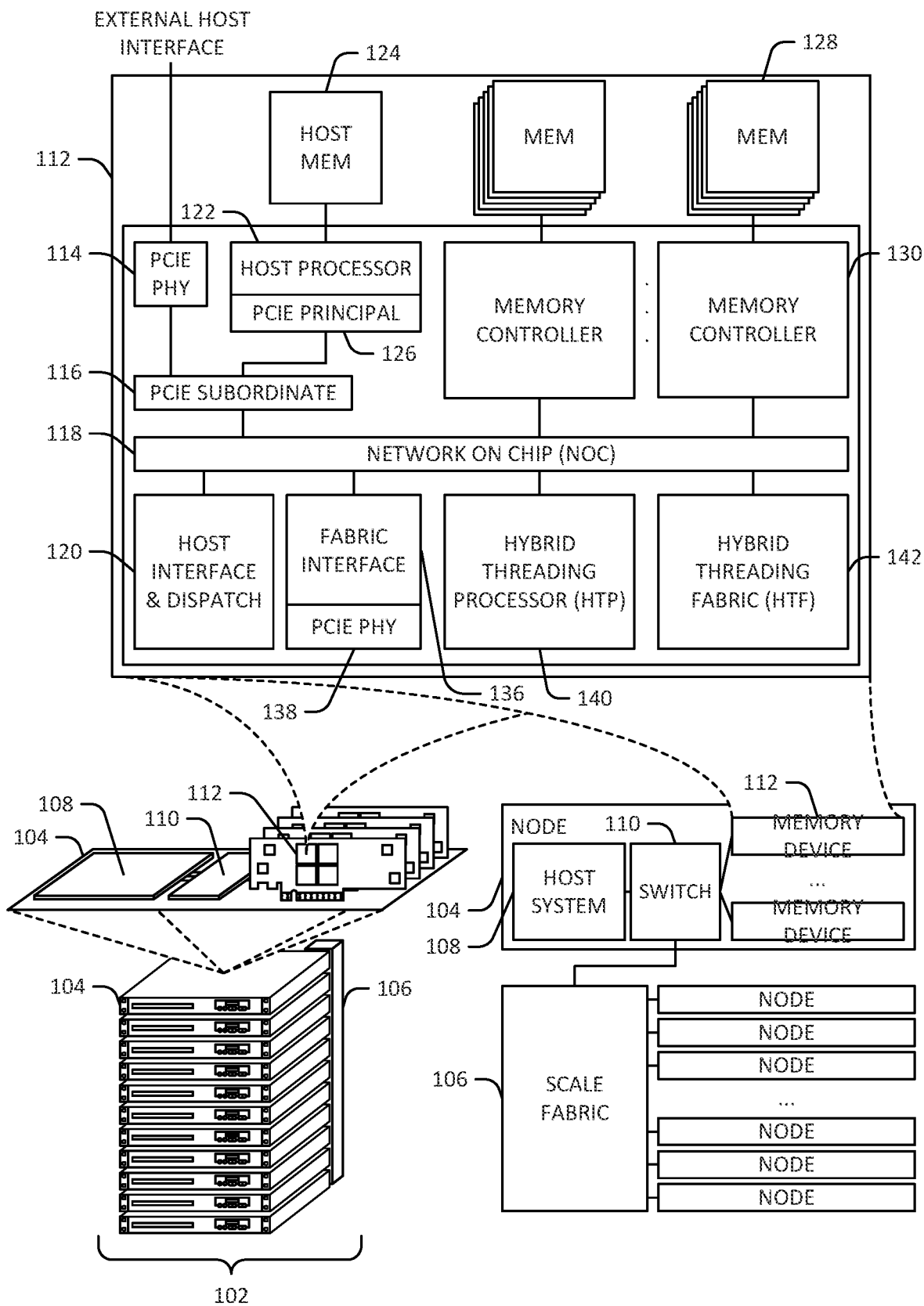
FIG. 1 illustrates generally a first example of a first memory-compute device in the context of a memory-compute system, according to an embodiment.

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general-purpose processors, and user-accessible accelerators, with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a CNM system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

'In an example, a CNM system may include various network structures connecting hardware compute elements. For example, the system scale fabric may be a network structure connecting the different nodes, where a node includes various compute elements. Within a node, a switch arrangement or fabric may be a network structure connecting a host system and/or various memory devices where the host system and/or memory devices can be compute elements. In an example, components of nodes, host systems, and/or memory devices may include a Network on a Chip (NOC) that acts as a network structure for various components on the respective chips.

To handle a communication request between compute elements, a network structure may selectively provide one or more data paths, referred to herein as busses, between the compute elements that are parties to the communication request. The busses provided by the network structure, and the direction thereof, may depend on the type of the communication request and, for example, the communication protocol that is used. For example, a network structure operating according to an Advanced eXtensible Interface (AXI) protocol, such as AXI4, may support read requests and write requests. Network structures operating according to other protocols may also support read requests and write requests.

In a read request, the network structure may provide a read address bus and a read data bus. The read address bus may be directed from a requestor compute element and to a responder compute element. Over the read address bus, the requestor compute element may provide control data including, for example, an address or other identifier of the requested data. The read data bus may be directed from the responder compute element and to the requestor compute element. Upon receiving the control data, the responder compute element may retrieve the requested data and provide it to the requestor compute element via the read data bus. The read data provided on the read data bus may include an identifier indicating the initial read request. In this way, the requestor compute element may relate the read data to the initial read request.

In a write request, the network structure may provide a write address bus, a write data bus, and a write confirmation bus. The write address bus and write data bus may be directed from the requestor compute element to the responder compute element. On the write data bus, the requestor compute element may provide data to be written by the responder compute element. For example, the responder compute element may be a hardware memory device and/or hardware memory controller. On the write address bus, the requestor compute element may provide various data including, for example, an address or location where the data is to be written. The write confirmation bus may be directed from the responder compute element to the requestor compute element. When the responder compute element has written the data, it may provide write response data on the write confirmation bus. The write response data may indicate that the transaction between the parties is complete. For example, the write response data may include an identifier indicating the original write request. In this way, when the requestor compute element receives the write response data, it may provide an indication of the write request that is complete.

In a CNM system, atomic operations may be useful, for example, when an operation performed by a compute element includes more than one memory access. Consider an example load and increment operation. To execute a load and increment operation, a compute element may load a data unit from a memory, sometimes referred to as old data or an old data unit. The compute element may increment the old data unit, and then write the resulting incremented data unit back to the memory. Also consider an example compare and swap operation in which an input data unit is compared to an old data unit already stored at a memory location. If one or more conditions are met, the data is swapped, that is the input data unit is written to the memory location. For example, the compute element may access memory a first time to read the old data item and also access memory a second time to write the input data unit, for example, if the condition is met.

In a CNM system, operations involving access to the same memory device may be requested by multiple different compute elements. According, operations that include more than one memory access may run the risk of a race condition. In a race condition, multi-access operations executed by different compute elements operate on the same memory location at the same time. This may affect the integrity of both operations. Consider an example multi-access load operation. If another operation modifies loaded data unit between the time that a first portion of the data unit is loaded and time that a second portion of the data unit is loaded, the loaded data unit may be incorrect.

One example way to prevent race conditions is to utilize atomic operations. An atomic operation is an operation including multiple accesses to a memory device where all of the accesses are configured to occur without interference from other operations being executed by other compute elements. This may avoid race conditions and associated data corruption.

In some examples, implementing atomic operations in a CNM system may present additional challenges. For example, a CNM system may be constructed with basic network structures that support read and write requests according to an AXI protocol or similar protocol. This may lead to cost, speed, and efficiency gains in the CNM system, however, such network structures may not specifically support requests for atomic operations. A CNM system could be constructed using network structures that do include built-in support for atomic operations, however, this may add to the cost and decrease the efficiency of the CNM system.

Various examples address these and other challenges by incorporating atomic operation support into a network structure using a read and/or write request. The read and/or write request may be arranged to AXI or a similar protocol. An atomic opcode may be incorporated into a read request or write request and transmitted from a first compute element to a second compute element via an address bus provided by a network structure. For example, in a read request, the atomic opcode may be transmitted on a read address bus. In a write request, the atomic opcode may be transmitted on a write address bus. The atomic opcode may indicate a type of atomic operation to be executed. Upon receiving a read or write request including an atomic opcode, the second compute element may execute the atomic transaction indicated by the atomic opcode. In this way, a CNM system may use the cost and efficiency gains associated with basic network structures while also avoiding race condition risk by using atomic transactions.

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, which can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, the chiplet protocol interface (CPI), and/or AXI among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats and/or between AXI and CXL formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, AXI is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets that can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142) and a host interface and dispatch module (HID 120). The HID 120 can be configured to facilitate access to host-based command request queues and response queues. In an example, the HID 120 can dispatch new threads of execution on processor or compute elements of the HTP 140 or the HTF 142. In an example, the HID 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 2:
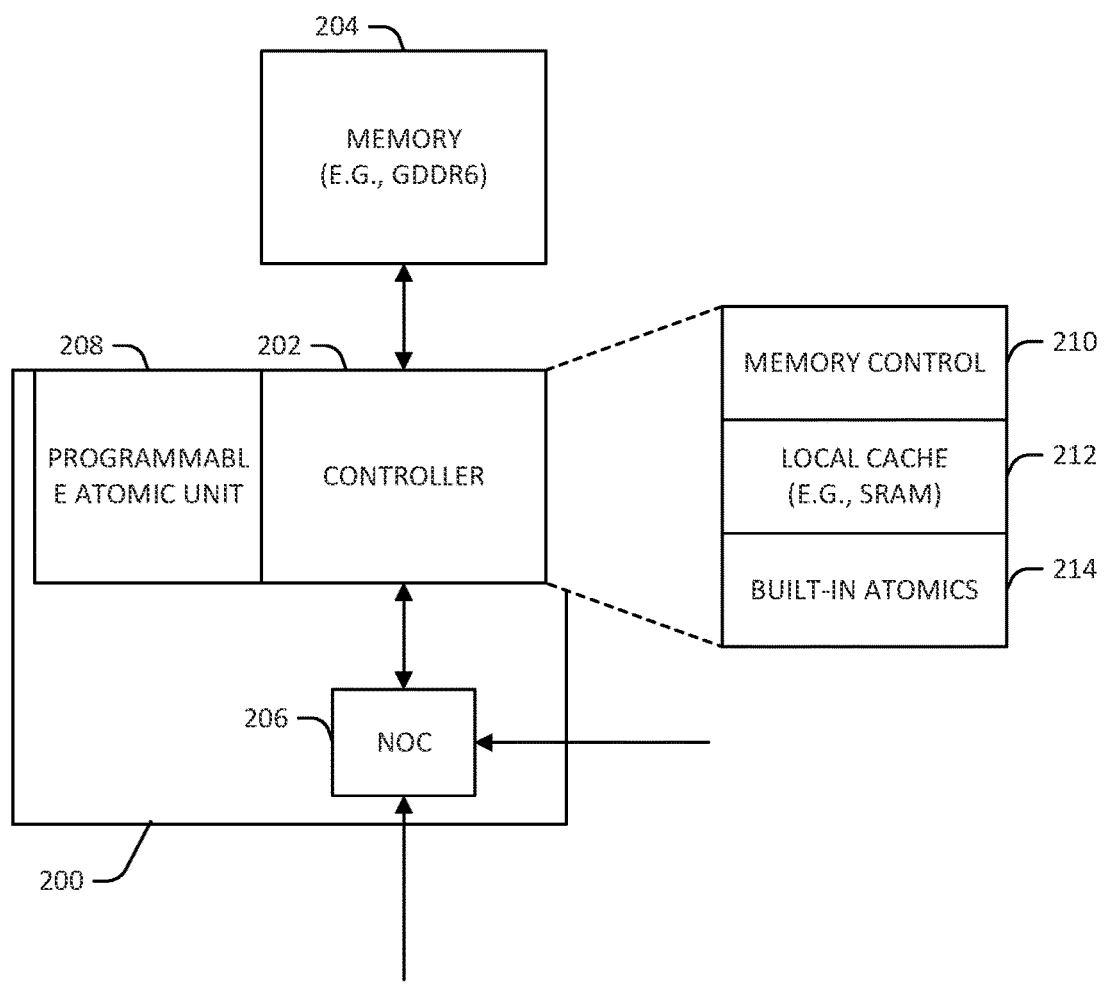
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. The programmable atomic unit 208 is one example of a hardware compute element described elsewhere herein. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively accessed memory locations. In an example, the local cache module 212 can provide a read buffer for sub-memory line accesses. The local cache module 212 can be particularly beneficial for compute elements that have relatively small or no data caches.

The memory control module 210, which can include a DRAM controller, can provide low-level request buffering and scheduling, such as to provide efficient access to the memory device 204, and can include a DRAM device. In an example, the memory device 204 can include or use a GDDR6 DRAM device, having 16 Gb density and 64 Gb/sec peak bandwidth. Other devices can similarly be used.

In an example, the programmable atomic unit 208 can comprise single-cycle or multiple-cycle operators which can be configured to perform integer addition or more complicated multiple-instruction operations, such as a bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
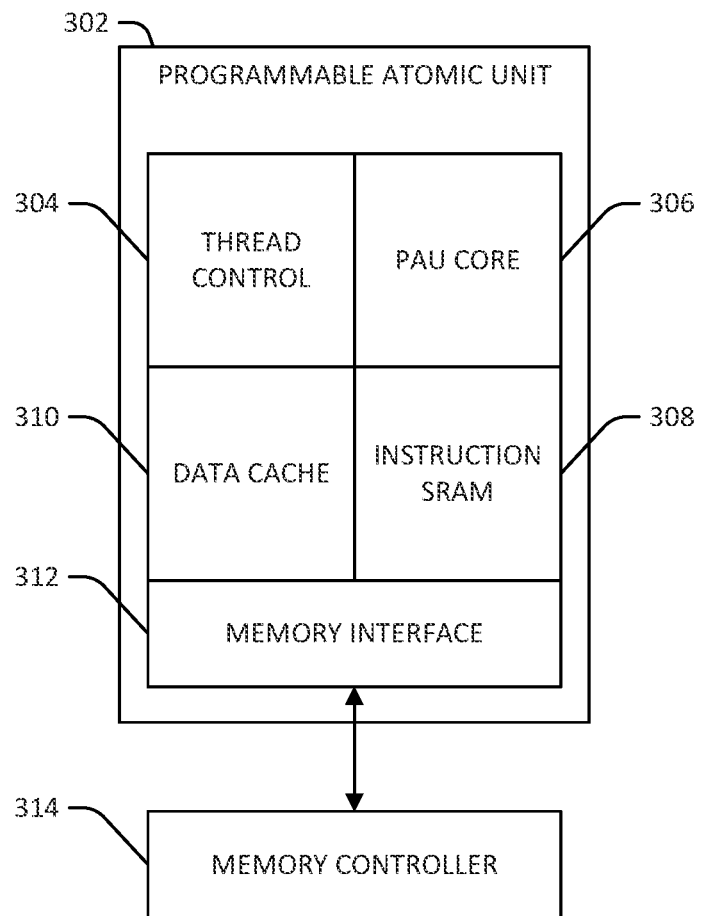
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2. That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with the memory controller 314. In an example, the memory controller 314 comprises an example of the controller 202 from the example of FIG. 2. Atomic operations utilizing the programmable atomic unit 302 and/or the programmable atomic unit 208 may be requested and managed using read and write requests, for example, as described herein.

In an example, the PAU core 306 is a pipelined processor on which multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, which can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) local to the programmable atomic unit 302.

In an example, atomic operators manipulate the data cache 310, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314, or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurs beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 310 includes data for the requested memory address, the presence of the in-flight memory request makes it uncertain what the data in the data cache 310 at that address should be. Thus, the thread must wait for the in-flight memory request to be completed to operate on current data. The hazard is cleared when the memory request completes.

In an example, the hazard is a dirty cache line in the data cache 310 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the cache or data cache 310 inside the PAU. If the cache line is dirty, then the built-in atomic operator will not be operating on the most current data until the cache is flushed to synchronize the cache and the other or off-die memories. This same situation could occur with other hardware blocks of the memory controller, such as cryptography block, encoder, etc.

Figure 4:
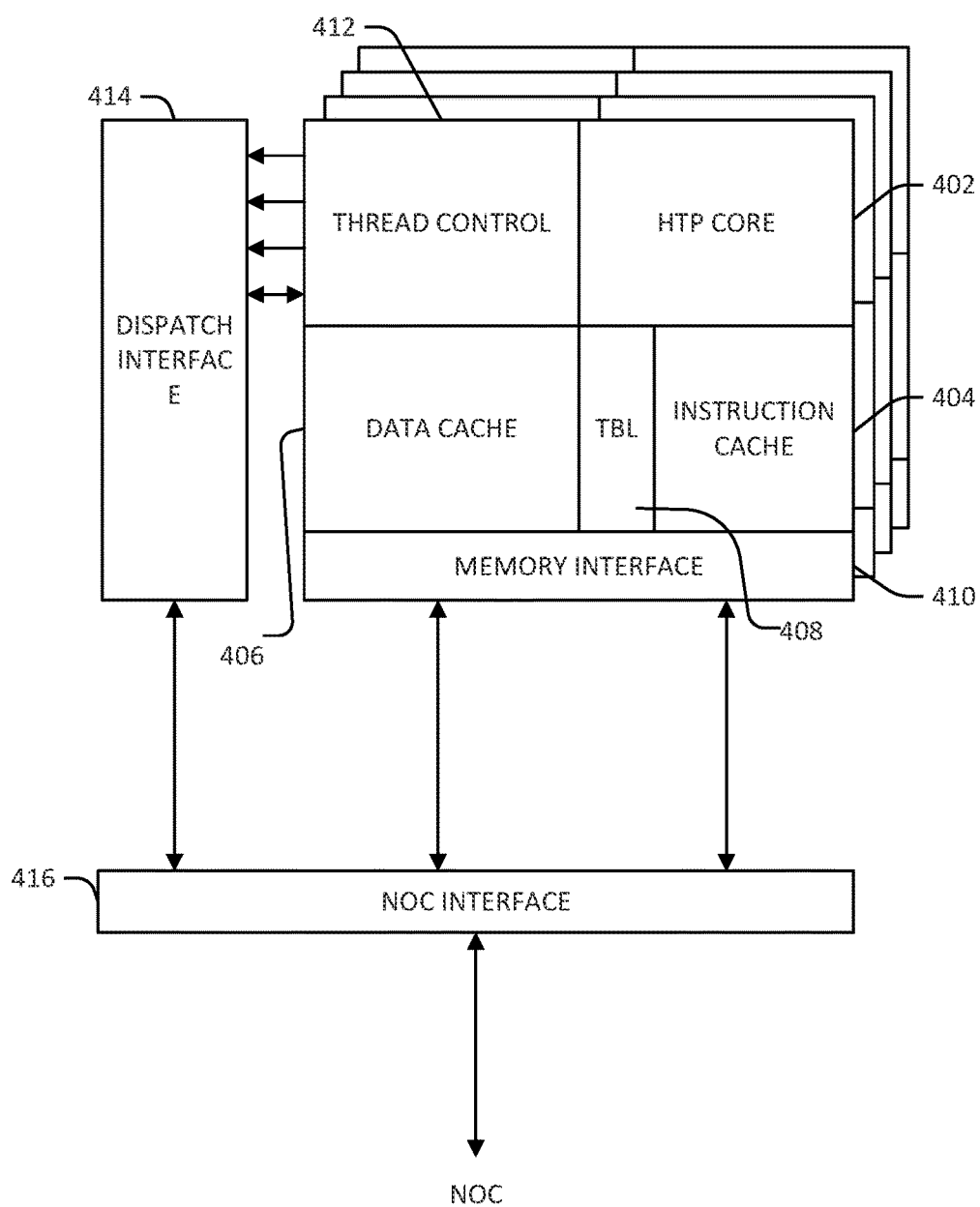
FIG. 4 illustrates an example of a hybrid threading processor (HTP) accelerator of a memory-compute device, according to an embodiment.

FIG. 4 illustrates an example of a hybrid threading processor (HTP) accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, an HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or other NOC.

In an example, the HTP accelerator 400 includes a module that is based on a RISC-V instruction set and can include a relatively small number of other or additional custom instructions to support a low-overhead, threading-capable Hybrid Threading (HT) language. The HTP accelerator 400 can include a highly threaded processor core, the HTP core 402, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators. Non-HTP accelerators, however, are generally not able to dispatch work. In an example, work dispatched from a host can use dispatch queues that reside in, e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes points where data is accessed only once, and that cause thrashing of the cache lines. To help address this problem, the HTP accelerator 400 can use a set of custom load instructions to force a load instruction to check for a cache hit, and on a cache miss to issue a memory request for the requested operand and not put the obtained data in the data cache 406. The HTP accelerator 400 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 406, and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

Figure 5:
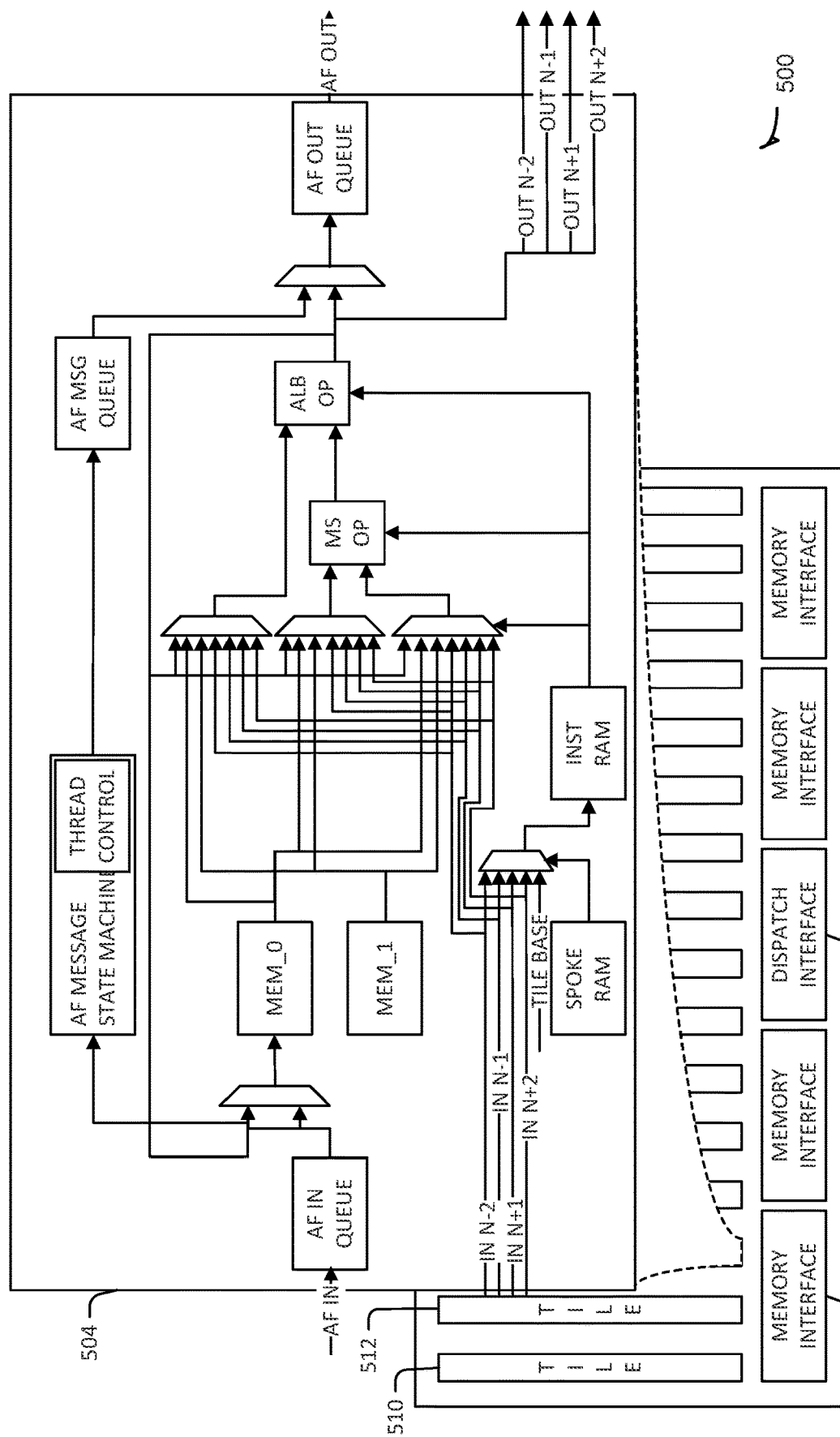
FIG. 5 illustrates an example of a representation of a hybrid threading fabric (HTF) of a memory-compute device, according to an embodiment.

FIG. 5 illustrates an example of a representation of a hybrid threading fabric (HTF), or HTF 500, of a memory-compute device, according to an embodiment. In an example, the HTF 500 can include or comprise the HTF 142 from the example of FIG. 1. The HTF 500 is a coarse-grained, reconfigurable compute fabric that can be optimized for high-level language operand types and operators (e.g., using C/C++ or other high-level language). In an example, the HTF 500 can include configurable, n-bit wide (e.g., 512-bit wide) data paths that interconnect hardened SIMD arithmetic units.

In an example, the HTF 500 comprises an HTF cluster 502 that includes multiple HTF tiles, including an example tile 504, or Tile N. Each HTF tile can implement one or more compute elements with local tile or compute element memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 5, the tiles comprising the HTF cluster 502 are linearly arranged, and each tile in the cluster can be coupled to one or multiple other tiles in the HTF cluster 502. In the example of FIG. 5, the example tile 504, or Tile N, is coupled to four other tiles, including to a tile base of a tile 510 (e.g., Tile N−2) via the port labeled SF IN N−2, to an adjacent tile 512 (e.g., Tile N−1) via the port labeled SF IN N−1, and to a Tile N+1 via the port labeled SF IN N+1 and to a Tile N+2 via the port labeled SF IN N+2. The tile base is a hardware portion of a tile, such as tile 504, 510, 512, that is configured to initiate threads and/or otherwise act as a flow controller. The example tile 504 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 502 can be arranged in a grid or other configuration, with each tile similarly coupled to one or several of its nearest neighbors in the grid. Tiles that are provided at an edge of a cluster can optionally have fewer connections to neighboring tiles. For example, Tile N−2, or the tile base of the tile 510 in the example of FIG. 5, can be coupled only to the adjacent tile 512 (Tile N−1) and to the example tile 504 (Tile N). Fewer or additional inter-tile connections can similarly be used.

The HTF cluster 502 can further include memory interface modules, including a first memory interface module 506. The memory interface modules can couple the HTF cluster 502 to a NOC, such as the first NOC 118. In an example, the memory interface modules can allow tiles within a cluster to make requests to other locations in a memory-compute system, such as in the same or different node in the system. That is, the representation of the HTF 500 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 5, the tiles in the HTF cluster 502 are coupled using a synchronous fabric (SF). The synchronous fabric can provide communication between a particular tile and its neighboring tiles in the HTF cluster 502, as described above. Each HTF cluster 502 can further include an asynchronous fabric (AF) that can provide communication among, e.g., the tiles in the cluster, the memory interfaces in the cluster, and a dispatch interface 508 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous flow pipeline in a tile, the control information can arrive at a tile a few clock cycles before the data field. Various registers can be provided to help coordinate dataflow timing in the pipeline.

In an example, each tile in the HTF cluster 502 can one or more tile memories. Each tile memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous flow, or can include a result of a load operation such as initiated by another synchronous flow. The tile memory can be read via synchronous data path instruction execution in the synchronous flow.

In an example, each tile in an HTF cluster 502 can have a dedicated instruction RAM (INST RAM). In an example of an HTF cluster 502 with sixteen tiles, and respective instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs, and can support nested looping kernels.

The synchronous fabric can allow multiple tiles (e.g., multiple compute elements thereof) to be pipelined, such as without a need for data queuing. Compute elements that participate in a synchronous flow can, for example, act as a single pipelined data path. A flow controller for a synchronous flow may be or include a tile (e.g., Tile N−2, in the example of FIG. 5), a compute element on a tile, and/or a tile base or controller on a tile. The flow controller of a synchronous flow can initiate a thread of work through the pipelined tiles. The flow controller can be responsible for starting a thread on a predefined cadence referred to herein as a Spoke Count. For example, if the Spoke Count is 3, then the tile base can initiate a thread every third clock cycle.

In an example, the synchronous flow comprises a set of connected compute elements in the HTF cluster 502. Execution of a thread can begin at the flow controller and can progress from the flow controller, via the synchronous fabric, to other compute elements (e.g., at other tiles in the same synchronous flow). The flow controller can provide the instruction to be executed for the first compute element. The first compute element can, by default, provide the same instruction for the other connected compute elements to execute. However, in some examples, the flow controller, or a subsequent compute element, can implement a conditional operation that specifies or uses an alternative instruction. The alternative instruction can be chosen by having the compute element's data path produce a Boolean conditional value, and then can use the Boolean value to choose between an instruction set of the current compute element and the alternate instruction.

The asynchronous fabric can be used to perform operations that occur asynchronously relative to a synchronous flow. Each tile in the HTF cluster 502 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1 (MEM_1). Control messages can be configured to control thread creation, to free resources, or to issue external memory references.

A tile in the HTF cluster 502 can perform various compute operations for the HTF. The compute operations can be performed by configuring the data path within the tile and/or compute elements thereof. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Multiply and Add, or a Shift and Add, among others.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 504 can include a Spoke RAM. The Spoke RAM can be used to specify which input (e.g., from among the four SF tile inputs and the tile base input) is the primary input for each clock cycle. The Spoke RAM read address input can originate at a counter that counts from zero to Spoke Count minus one. In an example, different spoke counts can be used on different tiles, such as within the same HTF cluster 502, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

Figure 6A:
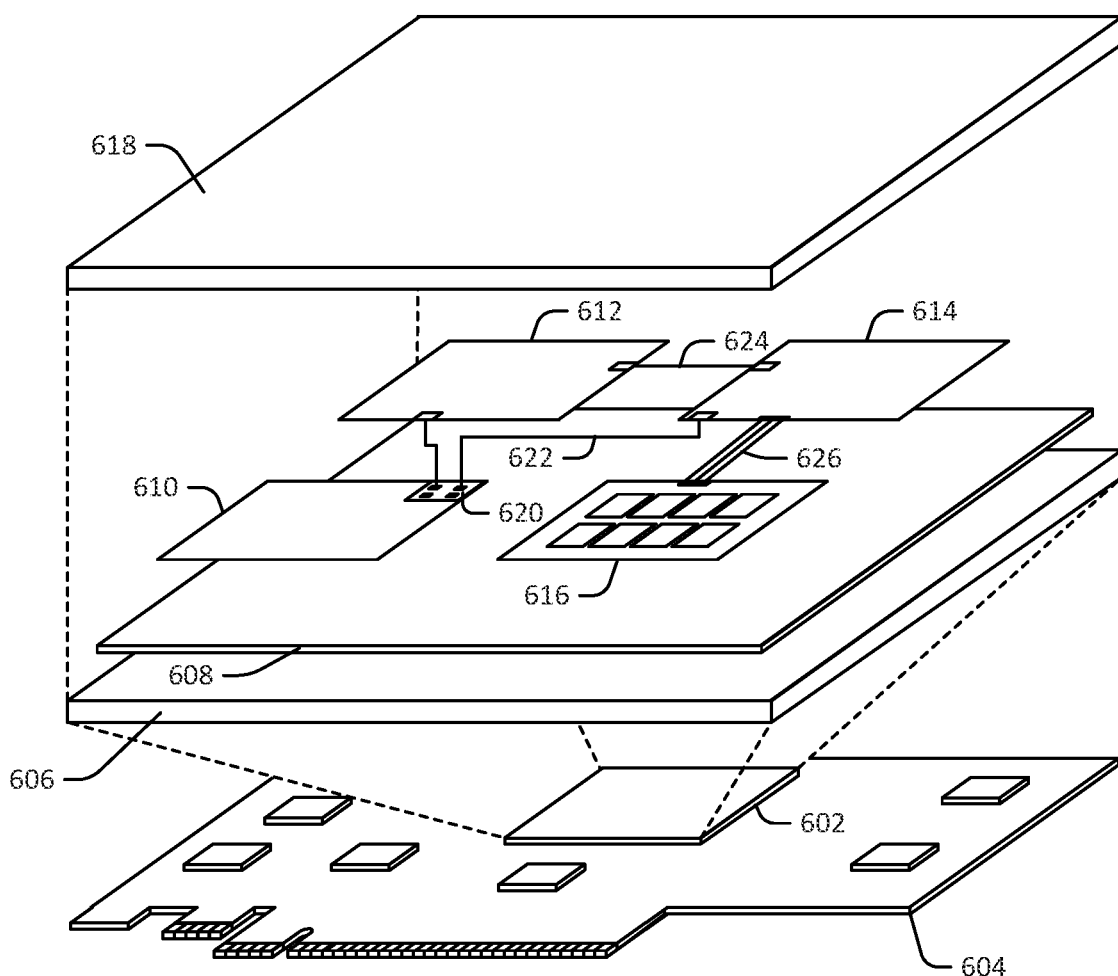
FIG. 6A illustrates generally an example of a chiplet system, according to an embodiment.
Figure 6B:
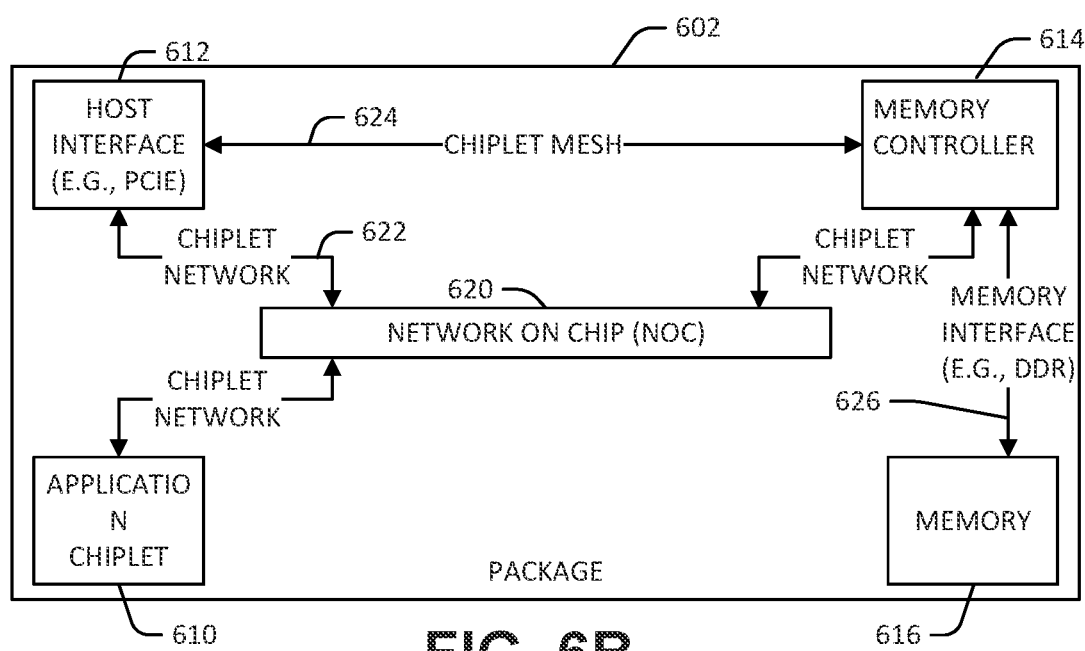
FIG. 6B illustrates generally a block diagram showing various components in the chiplet system from the example of FIG. 6A.

FIG. 6A and FIG. 6B illustrate generally an example of a chiplet system that can be used to implement one or more aspects of the CNM system 102 of FIG. 1. As similarly mentioned above, a node in the CNM system 102, or a device within a node in the CNM system 102, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 6A and FIG. 6B illustrate generally an example of a chiplet system, according to an embodiment. FIG. 6A is a representation of the chiplet system 602 mounted on a peripheral board 604, that can be connected to a broader computer system by a peripheral component interconnect express (PCIe), for example. The chiplet system 602 includes a package substrate 606, an interposer 608, and four chiplets, an application chiplet 610, a host interface chiplet 612, a memory controller chiplet 614, and a memory device chiplet 616. Other systems can include many additional chiplets to provide additional functionalities as will be apparent from the following discussion. The package of the chiplet system 602 is illustrated with a lid or cover 618, though other packaging techniques and structures for the chiplet system can be used. FIG. 6B is a block diagram labeling the components in the chiplet system for clarity.

The application chiplet 610 is illustrated as including a chiplet system NOC 620 to support a chiplet network 622 for inter-chiplet communications. In example embodiments the chiplet system NOC 620 can be included on the application chiplet 610. In an example, the first NOC 118 from the example of FIG. 1 can be defined in response to selected support chiplets (e.g., host interface chiplet 612, memory controller chiplet 614, and memory device chiplet 616) thus enabling a designer to select an appropriate number or chiplet network connections or switches for the chiplet system NOC 620. In an example, the chiplet system NOC 620 can be located on a separate chiplet, or within the interposer 608. In examples as discussed herein, the chiplet system NOC 620 implements a chiplet protocol interface (CPI) network.

In an example, the chiplet system 602 can include or comprise a portion of the first memory-compute node 104 or the first memory-compute device 112. That is, the various blocks or components of the first memory-compute device 112 can include chiplets that can be mounted on the peripheral board 604, the package substrate 606, and the interposer 608. The interface components of the first memory-compute device 112 can comprise, generally, the host interface chiplet 612; the memory and memory control-related components of the first memory-compute device 112 can comprise, generally, the memory controller chiplet 614; the various accelerator and processor components of the first memory-compute device 112 can comprise, generally, the application chiplet 610 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 622. For example, AXI is a specification for intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 622.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 608. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os) or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 610, provides a sender, such as the memory controller chiplet 614, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 6A includes a chiplet mesh network 624 that uses a direct, chiplet-to-chiplet technique without a need for the chiplet system NOC 620. The chiplet mesh network 624 can be implemented in CPI, or another chiplet-to-chiplet protocol. The chiplet mesh network 624 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system) can be through a desired interface (for example, a PCIe interface). Such an external interface can be implemented, in an example, through the host interface chiplet 612, which in the depicted example, provides a PCIe interface external to chiplet system. Such dedicated chiplet interfaces 626 are generally employed when a convention or standard in the industry has converged on such an interface. The illustrated example of a Double Data Rate (DDR) interface connecting the memory controller chiplet 614 to a dynamic random access memory (DRAM) memory device chiplet 616 is just such an industry convention.

Of the variety of possible support chiplets, the memory controller chiplet 614 is likely present in the chiplet system due to the near omnipresent use of storage for computer processing as well as sophisticated state-of-the-art for memory devices. Thus, using memory device chiplets 616 and memory controller chiplets 614 produced by others, gives chiplet system designers access to robust products by sophisticated producers. Generally, the memory controller chiplet 614 provides a memory device-specific interface to read, write, or erase data. Often, the memory controller chiplet 614 can provide additional features, such as error detection, error correction, maintenance operations, or atomic operator execution. For some types of memory, maintenance operations tend to be specific to the memory device chiplet 616, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 614. In other chiplet systems, the atomic operators can be performed by other chiplets. For example, an atomic operator of "increment" can be specified in a command by the application chiplet 610, the command including a memory address and possibly an increment value. Upon receiving the command, the memory controller chiplet 614 retrieves a number from the specified memory address, increments the number by the amount specified in the command, and stores the result. Upon a successful completion, the memory controller chiplet 614 provides an indication of the command success to the application chiplet 610. Atomic operators avoid transmitting the data across the chiplet mesh network 624, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 614. In some examples, atomic operators may be requested and/or executed using read and write requests, as described herein.

The memory device chiplet 616 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 616 as a chiplet, however, the device can reside elsewhere, such as in a different package on the peripheral board 604. For many applications, multiple memory device chiplets can be provided. In an example, these memory device chiplets can each implement one or multiple storage technologies and may include integrated compute hosts. In an example, a memory chiplet can include multiple stacked memory die of different technologies; for example, one or more static random access memory (SRAM) devices stacked or otherwise in communication with one or more dynamic random access memory (DRAM) devices. In an example, the memory controller chiplet 614 can serve to coordinate operations between multiple memory chiplets in the chiplet system 602, for example, to use one or more memory chiplets in one or more levels of cache storage, and to use one or more additional memory chiplets as main memory. The chiplet system 602 can include multiple memory controller chiplet 614 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 7:
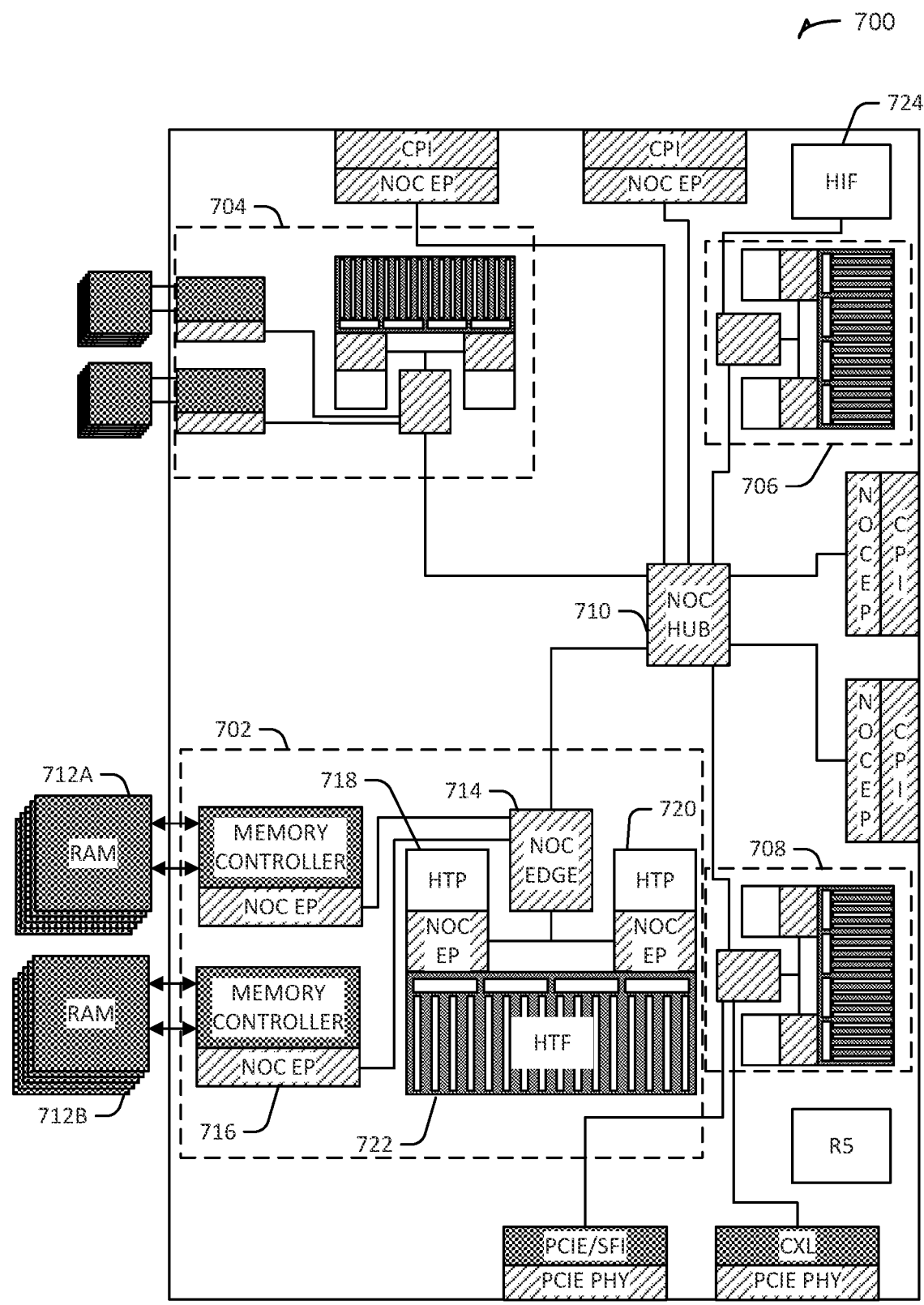
FIG. 7 illustrates generally an example of a chiplet-based implementation for a memory-compute device, according to an embodiment.

FIG. 7 illustrates generally an example of a chiplet-based implementation for a memory-compute device, according to an embodiment. The memory-compute device may be one example of a hardware compute element described elsewhere herein. The example includes an implementation with four compute-near-memory, or CNM, chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example, chiplet system 602 from FIG. 6A and FIG. 6B.

The example of FIG. 7 includes a first CNM package 700 comprising multiple chiplets. The first CNM package 700 includes a first chiplet 702, a second chiplet 704, a third chiplet 706, and a fourth chiplet 708 coupled to a CNM NOC hub 710. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 7, the first chiplet 702 includes a first NOC hub edge 714 coupled to the CNM NOC hub 710. The other chiplets in the first CNM package 700 similarly include NOC hub edges or endpoints. The switches in the NOC hub edges facilitate intra-chiplet, or intra-chiplet-system, communications via the CNM NOC hub 710.

The first chiplet 702 can further include one or multiple memory controllers 716. The memory controllers 716 can correspond to respective different NOC endpoint switches interfaced with the first NOC hub edge 714. In an example, the memory controller 716 comprises the memory controller chiplet 614 or comprises the memory controller 130, or comprises the memory subsystem 200, or other memory-compute implementation. The memory controllers 716 can be coupled to respective different memory devices, for example including a first external memory module 712a or a second external memory module 712b. The external memory modules can include, e.g., GDDR6 memories that can be selectively accessed by the respective different chiplets in the system.

The first chiplet 702 can further include a first HTP chiplet 718 and second HTP chiplet 720, such as coupled to the first NOC hub edge 714 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 722. The HTF chiplet 722 can correspond to an HTF accelerator, such as the HTF 142 from the example of FIG. 1, or the HTF 500 from the example of FIG. 5.

The CNM NOC hub 710 can be coupled to NOC hub instances in other chiplets or other CNM packages by way of various interfaces and switches. For example, the CNM NOC hub 710 can be coupled to a CPI interface by way of multiple different NOC endpoints on the first CNM package 700. Each of the multiple different NOC endpoints can be coupled, for example, to a different node outside of the first CNM package 700. In an example, the CNM NOC hub 710 can be coupled to other peripherals, nodes, or devices using CTCPI or other, non-CPI protocols. For example, the first CNM package 700 can include a PCIe scale fabric interface (PCIE/SFI) or a CXL interface (CXL) configured to interface the first CNM package 700 with other devices. In an example, devices to which the first CNM package 700 are coupled using the various CPI, PCIe, CXL, or other fabric, can make up a common global address space.

In the example of FIG. 7, the first CNM package 700 includes a host interface 724 (HIF) and a host processor (R5). The host interface 724 can correspond to, for example, the HID 120 from the example of FIG. 1. The host processor, or R5, can correspond to the internal host processor 122 from the example of FIG. 1. The host interface 724 can include a PCI interface for coupling the first CNM package 700 to other external devices or systems. In an example, work can be initiated on the first CNM package 700, or a tile cluster within the first CNM package 700, by the host interface 724. For example, the host interface 724 can be configured to command individual HTF tile clusters, such as among the various chiplets in the first CNM package 700, into and out of power/clock gate modes.

Figure 8:
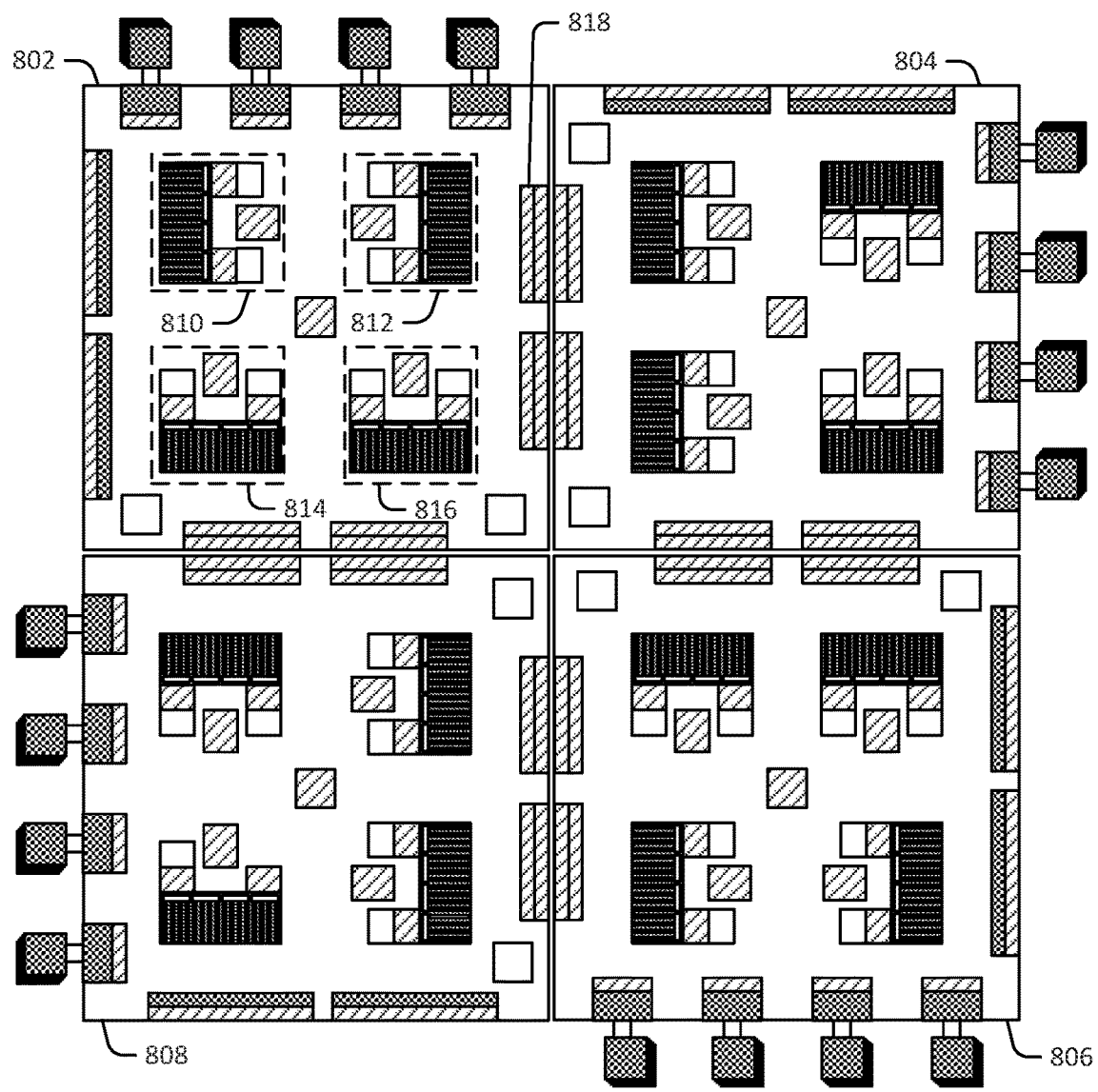
FIG. 8 illustrates an example tiling of memory-compute device chiplets, according to an embodiment.

FIG. 8 illustrates an example tiling of memory-compute devices, according to an embodiment. In FIG. 8, a tiled chiplet example 800 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 800 includes, as one or multiple of its compute-near-memory (CNM) clusters, instances of the first CNM package 700 from the example of FIG. 7. For example, the tiled chiplet example 800 can include a first CNM cluster 802 that includes a first chiplet 810 (e.g., corresponding to the first chiplet 702), a second chiplet 812 (e.g., corresponding to the second chiplet 704), a third chiplet 814 (e.g., corresponding to the third chiplet 706), and a fourth chiplet 816 (e.g., corresponding to the fourth chiplet 708). The chiplets in the first CNM cluster 802 can be coupled to a common NOC hub, which in turn can be coupled to a NOC hub in an adjacent cluster or clusters (e.g., in a second CNM cluster 804 or a fourth CNM cluster 808).

In the example of FIG. 8, the tiled chiplet example 800 includes the first CNM cluster 802, the second CNM cluster 804, a third CNM cluster 806, and the fourth CNM cluster 808. The various different CNM chiplets can be configured in a common address space such that the chiplets can allocate and share resources across the different tiles. In an example, the chiplets in the cluster can communicate with each other. For example, the first CNM cluster 802 can be communicatively coupled to the second CNM cluster 804 via an inter-chiplet CPI interface 818, and the first CNM cluster 802 can be communicatively coupled to the fourth CNM cluster 808 via another or the same CPI interface. The second CNM cluster 804 can be communicatively coupled to the third CNM cluster 806 via the same or other CPI interface, and so on.

In an example, one of the compute-near-memory chiplets in the tiled chiplet example 800 can include a host interface (e.g., corresponding to the host interface 724 from the example of FIG. 7) that is responsible for workload balancing across the tiled chiplet example 800. The host interface can facilitate access to host-based command request queues and response queues, such as from outside of the tiled chiplet example 800. The host interface can dispatch new threads of execution using hybrid threading processors and the hybrid threading fabric in one or more of the compute-near-memory chiplets in the tiled chiplet example 800.

Figure 9:
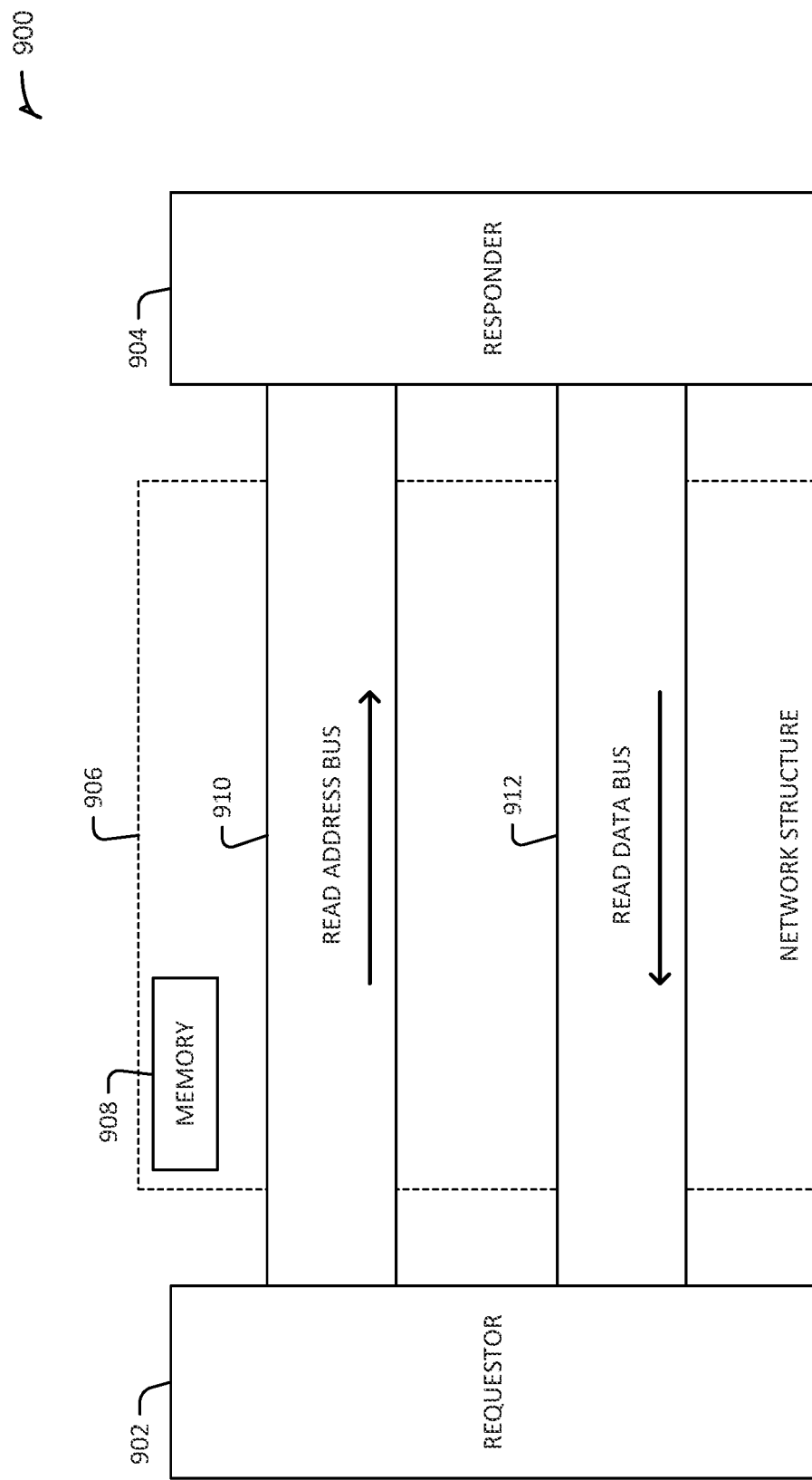
FIG. 9 illustrates an example arrangement including a read request made by a requestor hardware compute element to a responder hardware compute element.

FIG. 9 illustrates an example arrangement 900 including a read request made by a requestor hardware compute element 902 to a responder hardware compute element 904. The arrangement 900 includes the requestor hardware compute element 902, the responder hardware compute element 904 and a network structure 906.

The network structure 906 may be a hardware component or combination of components that connect hardware compute elements, such as the requestor compute element 902 and responder compute element 904. Referring to the example of FIG. 1, the scale fabric 106, the first switch 110, and the NOC 118 may make up all or part of a network structure such as the network structure 906. Also, although the arrangement 900 of FIG. 9 shows the network structure 906 in communication with two compute elements 902, 904, it will be appreciated that the network structure 906 may be in communication with additional compute elements and may support multiple read requests and/or write requests simultaneously.

The requestor compute element 902 and responder compute element 904 may be or include any suitable hardware element that performs and/or requests a processing task. Using the example of FIGS. 1-8, the requestor compute element 902 and responder compute element 904 may be or include, for example, components of an HTP 140, elements of an HTF 142, a memory controller 130, and/or the like. In the arrangement 900 of FIG. 9, a read request is made by the requestor compute element 902 directed towards the responder compute element 904. In various examples, however, a compute element may be capable of both making and receiving read requests.

In the example of FIG. 9, the requestor compute element 902 makes a read request, for example, by providing read control data to the network structure 906. The read control data may include an address or other indicator of the responder compute element 904, an indicator of the desired data to be read, and/or other data. The network structure 906 is switched to a state that provides a read address bus 910 between the requestor compute element 902, and the responder compute element 904. The read address bus 910 may comprise a predetermined number of channels with each channel supporting the transfer of a predetermined size data unit from the requestor compute element 902 to the responder compute element 904. For example, the read address bus 910 may comprise a first channel sized to transfer an indicator of the data to be read, a second channel sized to transfer an indicator of the responder compute element 904, and/or the like. In an example, the read address bus 910 comprises a number of data paths for transferring all or part of the read control data between the requestor compute element 902 and the responder compute element 904.

The responder compute element 904, upon receiving the read control data, may provide read data in response. The read data may include, for example, data described by the read control data. In an example, upon receiving read control data via the read address bus 910, the responder compute element 904 retrieves the requested data. The network structure 906 may be switched to a state that provides the read data bus 912 between the responder compute element 904 and the requestor compute element 902. The responder compute element 904 may provide the read data to the requestor compute element 902 via the read data bus 912. The read data bus 912, for example, may include a number of parallel data paths for transmitting all or a portion of the read data in parallel from the responder compute element 904 to the requestor compute element 902.

The network structure 906 may be selectively switched to provide the read address bus 910 and read data bus 912 between the respective requestor compute element 902 and responder compute element 904 when needed to facilitate the read request. For example, the network structure 906 may comprise hardware for implementing multiple busses, including multiple read address busses 910, multiple read data busses 912. The network structure 906 may also include hardware for implementing various write request busses, such as busses 1010, 1012, and 1014 described with respect to FIG. 10. To facilitate data transfer between compute elements in a read request (or write request), the network structure 906 is switched to states that provide the appropriate bus or busses between the compute elements, such as the compute elements 902, 904.

The network structure 906 also comprises a memory 908. The memory 908 may store state data describing various read and/or write requests that are open or in-flight. For example, the read request illustrated in FIG. 9 may commence when the requestor compute element 902 provides the read control data to the network structure 906. In response, the network structure 906 may switch to a state that provides the read address bus 910 between the requestor compute element 902 and responder compute element 904. In this way, the requestor compute element 902 may provide the read control data to the responder compute element 904. The network structure 906 may also store a state of various read and/or write requests that are open. Consider an example in which read control data has been provided to the responder compute element 904, but read data has not yet been transferred back to the requestor compute element 902. The network structure 906 may store an indication of this open read request at the memory 908. The state data may include, for example, an indication of the requestor compute element 902, an indication of the responder compute element 904 and an indication that the read control data has been provided but no read data has been transferred back, and/or other data. When the responder compute element 904 provides the read data, the network structure 906 may be switched to a state that provides the read data bus 912 between the responder compute element 904 and the requestor compute element 902. The responder compute element 904 may transmit the read data to the requestor compute element 902 via the read data bus 912. When this transfer occurs, the read request may be complete. Accordingly, the network structure 906 may clear its state data describing the read request, for example, by deleting the state data and/or releasing the locations at the memory 908 storing the state data to be overwritten by new data (e.g., state data for a different communication request).

Figure 10:
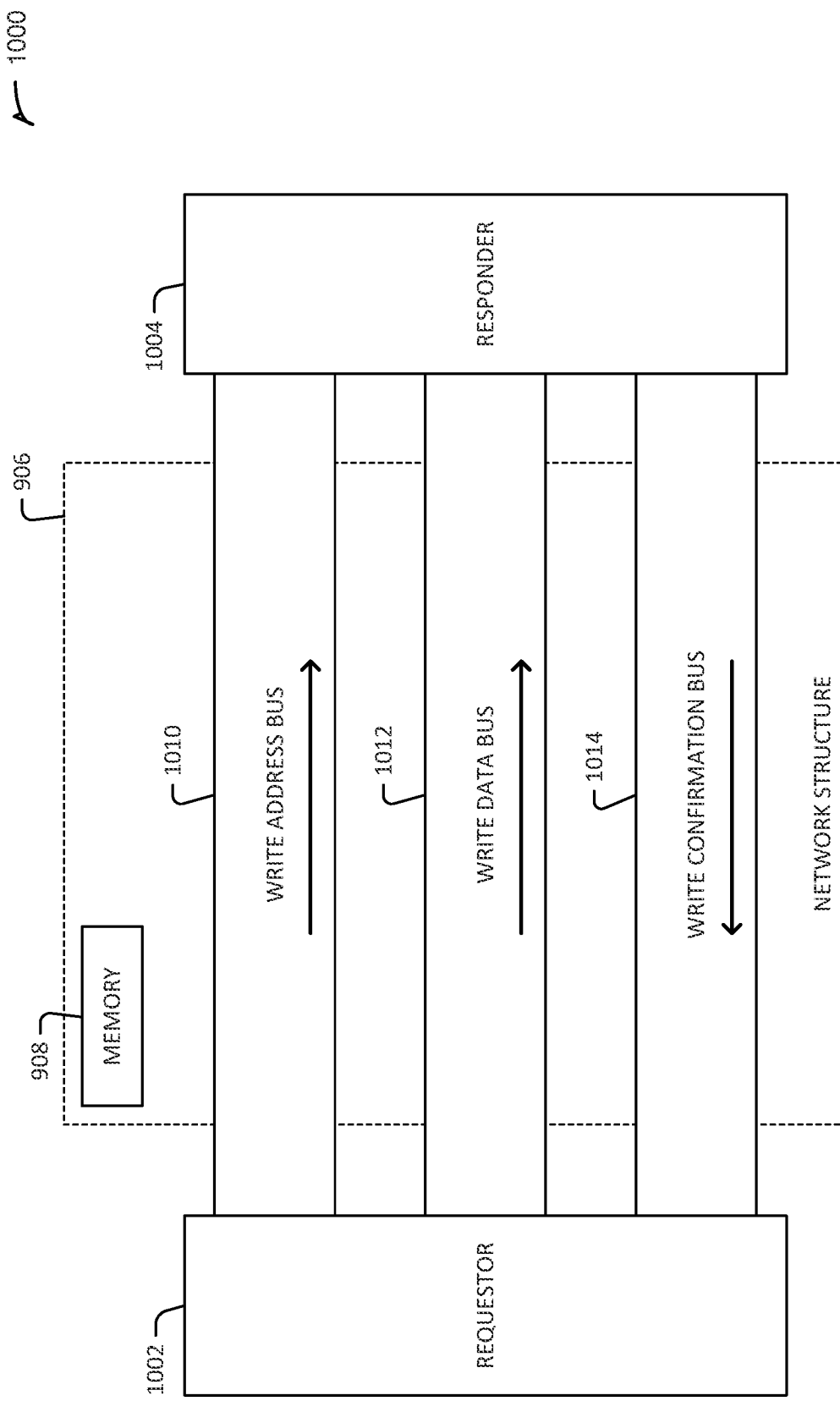
FIG. 10 illustrates an example arrangement including a write request made by a requestor hardware compute element to a responder hardware compute element via a network structure.

FIG. 10 illustrates an example arrangement 1000 including a write request made by a requestor hardware compute element 1002 to a responder hardware compute element 1004 via the network structure 906. The requestor compute element 1002 and responder compute element 1004 may be any suitable compute elements, as described herein.

In the example arrangement 1000, the requestor compute element 1002 provides write control data to the responder compute element 1004 via a write address bus 1010 provided by the network structure 906. The write control data may comprise, for example, an address or other indicator of the responder compute element 1004 and, in some examples, may include an indication of where data is to be written. In response to receiving the write control data, the network structure 906 switches to a state that provides the write address bus 1010 between the requestor compute element 1002 and the responder compute element 1004. The write address bus 1010 may comprise a predetermined number of channels, as described herein.

The requestor compute element 1002 may also provide write data to the responder compute element 1004. The network structure 906 may be switched to a state that provides the write data bus 1012 between the requestor compute element 1002 and the responder compute element 1004 to facilitate the provision of the write data to the responder compute element 1004.

Upon writing the write data, the responder compute element 1004 may provide confirmation data to the requestor compute element 1002. The network structure 906 may be switched to a state that provides the write confirmation bus 1014 between the responder compute element 1004 and the requestor element 1002; and, the responder compute element 1004 may provide the confirmation data to the requestor compute element 1002 via the write confirmation bus 1014 provided by the network structure 906. The write confirmation data may be part of a write confirmation data provided via the write confirmation bus 1014.

The network structure 906 may store state data for the write request arrangement shown in FIG. 10. For example, when the network structure 906 receives a write request, it may store state data describing the write request. The state data may include, for example, an indication of the requestor compute element 1002, an indication of the responder compute element 1004, and an indication of the state of completion of the write request. This may include, for example, an indication of whether write control data has been provided to the responder compute element 1004, whether write data has been provided to the responder compute element 1004, and whether the write confirmation data has been provided to the requestor compute element 1002. When the write confirmation data is provided to the requestor compute element 1002, the network structure 906 may close the write request, for example, by clearing the state data for the write request from the memory 908.

Various examples are directed to arrangements that utilize read and/or write requests to request atomic operations. For example, a first hardware compute element may send a read or write request to a second compute element. The control data for the request may indicate an atomic opcode describing a particular atomic operation. The second compute element may read the atomic opcode from the read and/or write request and, in response, may execute the requested atomic operation.

Figure 11:
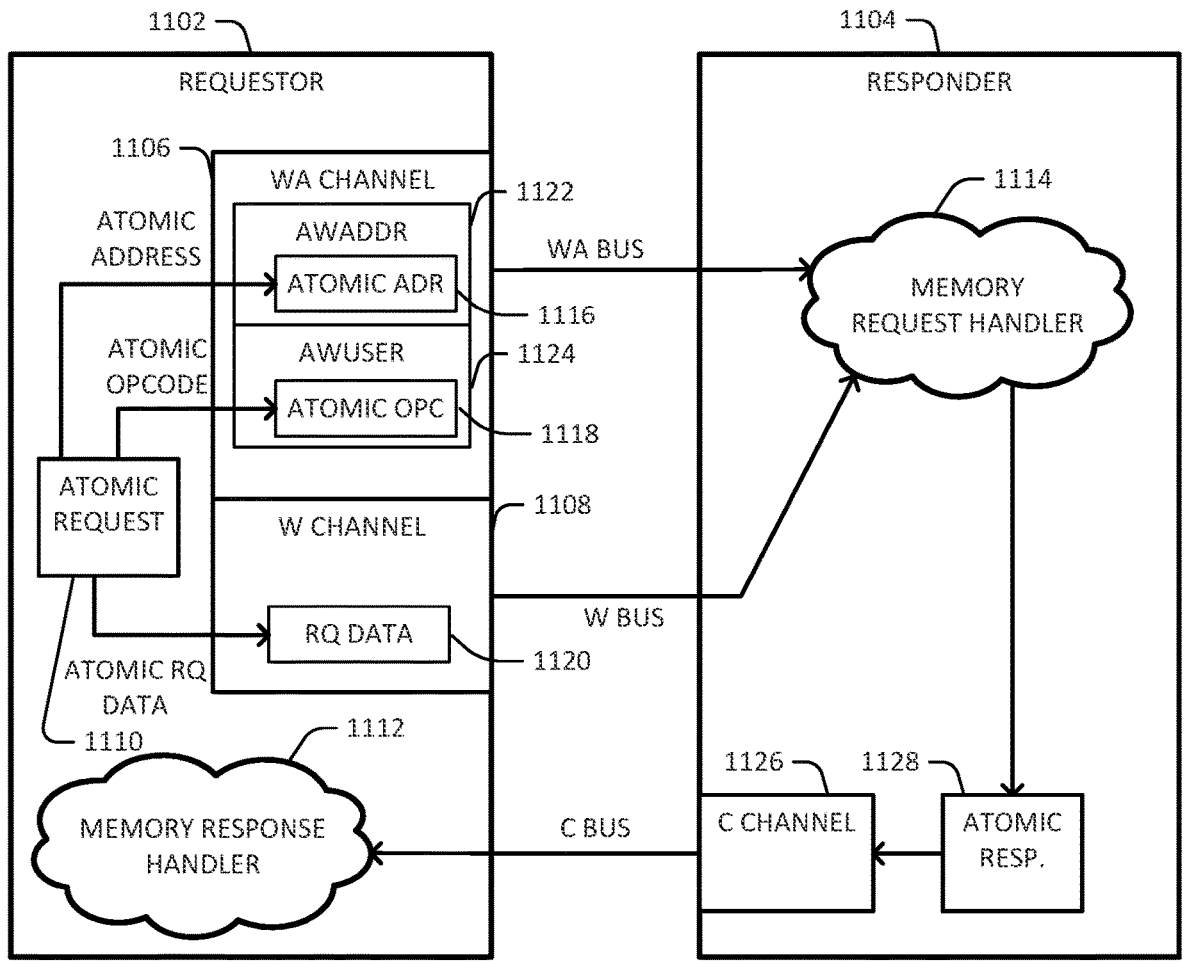
FIG. 11 is a diagram showing one example of an environment that may be implemented in a CNM system, such as the CNM system of FIG. 1, to send an atomic operation request from a requestor compute element to a responder hardware compute element.

FIG. 11 is a diagram showing one example of an environment 1100 that may be implemented in a CNM system, such as the CNM system of FIG. 1, to send an atomic operation request from a requestor compute element 1102 to a responder hardware compute element 1104. In the example transaction illustrated by FIG. 11, the requestor compute element 1102 sends an atomic operation request using a write request and corresponding busses, such as the write request and busses described herein with respect to FIG. 10. The requestor compute element 1102 sends the write request to the responder compute element 1104. For example, a network structure may provide a write address bus (WA BUS) and a write data bus (W BUS) from the requestor compute element 1102 to the responder compute element 1104. The network structure may also provide a write confirmation bus between the responder compute element 1104 and the requestor compute element 1102.

In an example, the atomic operation requested using the write request arrangement shown in FIG. 11 may be an atomic store operation. Atomic store operations include operations in which the requestor compute element 1102 provides request data 1120 that is to be written to a memory or stored by the responder compute element 1104 or other compute element that is to execute the requested atomic operation. For example, as described herein, the request or compute element 1102 may be configured to provide data to be stored in an atomic store operation via the write data bus of the network structure.

In the example of FIG. 11, the requestor compute element 1102 comprises a write address channel 1106 and a write data channel 1108, as well as a write confirmation channel 1126. The responder compute element 1104 comprises a confirmation channel 1126. Channels 1106, 1108, 1126 may be data paths including, for example, wires, busses, registers, and/or other similar hardware arranged to transmit data across one or more busses provided by a network structure, as described herein. It will be appreciated that the requestor compute element 1102 and/or responder compute element 1104 may comprise additional channels that are not shown in FIG. 11.

The hardware compute element 1102 comprises an atomic request circuit 1110 and a memory response handler 1112. The atomic request circuit 1110 may be configured to load data to the respective channels 1106, 1108 for transmission to the responder compute element 1104. In some examples, loading the data to the respective channels 1106, 1108 may prompt the network structure to provide one or more busses for transmitting the data to the responder compute element 1104. The memory response handler 1112 may receive confirmation data from the responder compute element 1104 indicating that the atomic operation request has been received and/or completed by the responder compute element 1104. The atomic request circuit 1110 and memory response handler 1112 may be or include dedicated hardware at the requestor compute element 1102 such as, for example, registers, microcontrollers, memory, and/or the like. In some examples, the atomic request circuit 1110 and/or memory response handler 1112 may be or include software executed by a processor, microcontroller, and/or other component of the requestor compute element 1102 to handle requests for atomic operations, as described herein.

The responder compute element may include an atomic response circuit 1128 and a memory request handler 1114. The memory request handler 1114 may be configured to handle incoming requests for atomic operations. For example, the memory request handler 1114 may receive data describing an incoming atomic operation request from the requestor compute element 1102 and prompt execution of the requested atomic operation at the responder compute element 1104 and/or at another compute element. The atomic response circuit 1128 may be configured to load confirmation data to the confirmation channel 1126 of the responder compute element 1104 for transmission to the requestor compute element 1102 via a confirmation bus (C BUS) provided by the network structure. The atomic response circuit 1128 and memory request handler 1114 may be or include dedicated hardware at the respective compute elements 1102, 1104 such as, for example, registers, microcontrollers, memory, and/or the like. In some examples, the atomic response circuit 1128 and/or memory request handler 1114 may be or include software executed by a processor, microcontroller, and/or other component of the respective compute elements 1102, 1104 to handle multiple-request transactions as described herein.

The requestor compute element 1102 may initiate the atomic operation request. For example, the atomic request circuit 1110 may load data to the write address channel 1106 and the write data channel 1108 for transmission to the responder compute element 1104. The atomic request circuit 1110 may load atomic request data to the write channel 1108. In some examples, loading the data to the respective channels 1106, 1108 may prompt the network structure to provide the write address bus WA BUS and write data bus W BUS for sending the data to the responder compute element 1104.

Data loaded to the write address channel 1106 may include, for example, atomic address data 1116 and atomic opcode data 1118. In some examples, the write address channel comprises subchannels 1122 and 1124. The atomic request circuit 1110 may load the atomic address data 1116 to the subchannel 1122 and may load the atomic opcode data 1118 to the subchannel 1124. In some examples in which an AXI protocol is used, the subchannel 1122 may correspond to the AWADDR subchannel on the write address bus and the subchannel 1124 may correspond to the AWUSER subchannel on the write address bus.

The atomic address data 1116 may comprise an address or other indicator of a compute element that is to execute the requested atomic operation. The compute element that is to handle the requested atomic operation may be the responder compute element 1104 and/or a different hardware compute element. For example, the responder compute element may be a hardware balancer compute element and may be configured to direct the atomic operation request to another compute element for execution. In some examples, the atomic address data 1116 may indicate a memory location or memory locations that are for use in the atomic transaction. For example, in an atomic store operation. The atomic opcode data 1118 may indicate the requested atomic operation. Different atomic opcodes may correspond to different requested atomic operations. In the example of FIG. 11, the atomic opcode data 1118 may correspond to an atomic store type operation. Other example atomic opcodes may refer to other atomic operations such as, for example, a compare-and-swap operation, a fetch-and-increment operation, a read or write that involves multiple memory locations, and/or the like. In an example fetch-and-increment operation an old data unit may be retrieved from a memory location, incremented (or otherwise operated on), with the result written back to the memory location. In a store that involves multiple memory locations, such as multiple lines, performing the operation atomically may involve reading from or writing to all of the distinct memory locations without any other component modifying the data at the memory locations.

The requestor compute element 1102 may indicate to a network structure that intends to send the atomic operation request, for example, as a write request. In some examples, the network structure provides one or more of the busses WA BUS and/or W BUS when the atomic request circuit 1110 loads the data 1116, 1118, 1120 to the respective channels 1108, 1106. When the network structure detects that data is present at the write address channel 1106 and/or the write data channel 1108, it may switch to a state that provides the write address bus WA BUS and write data bus W BUS between the requestor compute element 1102 and responder compute element 1104. The requestor compute element 1102 may send the data 1116, 1118 to the responder compute element 1104 via the write address bus WA BUS and the request data 1120 to the responder compute element 1104 via the write data bus W BUS.

At the responder compute element 1104, the memory request handler 1114 may receive the request data 1120, atomic address data 1116 and atomic opcode data 1118. The memory request handler 1114 may be configured to recognize the presence of the atomic opcode data 1118 and, thereby, recognize that the requestor compute element 1102 is making an atomic operation request rather than a non-atomic write request. In response, the memory request handler 1114 may prompt execution of the requested atomic operation.

In some examples, the memory request handler 1114 may prompt execution of the requested atomic operation at the responder compute element 1104. For example, the responder compute element 1104 may comprise atomic operation hardware, such as a processor, microcontroller, or other hardware that is configured to perform atomic operations. The memory request handler 1114 may load the request data 1120 to a register or other memory location of the atomic operation hardware and instruct the atomic operation hardware to execute the requested atomic operation. For example, the atomic operation hardware may load some or all of the request data 1120 to a memory location indicated by the atomic address data 1116 in an atomic manner.

In other examples, the memory request handler 1114 may send a subsequent atomic operation request to another compute element, requesting that the other compute element execute the atomic operation. In some examples, the other compute element is, for example, a compute element that is nearer to the memory location where the request data 1120 will be stored. In other examples, the other compute element is a memory controller associated with a memory device where the request data 1120 will be stored. The memory request handler 1114 may send the atomic operation request to the other compute element in any suitable manner. In some examples, the memory request handler 1114 (or other suitable component or components of the responder compute element 1104) make the atomic operation request to the other compute element in the same way that the requestor compute element 1102 requested the atomic operation of the responder compute element 1104.

The memory request handler 1114 may also provide an indication of the status of the atomic operation request from the requestor compute element 1102 to the atomic response circuit 1128. The atomic response circuit 1128 may load confirmation data to the confirmation channel 1126. Confirmation data loaded to the confirmation channel 1126 may be provided to the memory response handler 1112 of the requestor compute element 1102 via the write confirmation bus C BUS. In some examples, the atomic response circuit 1128 initiates provision of the confirmation data after completion of the atomic operation.

Figure 12:
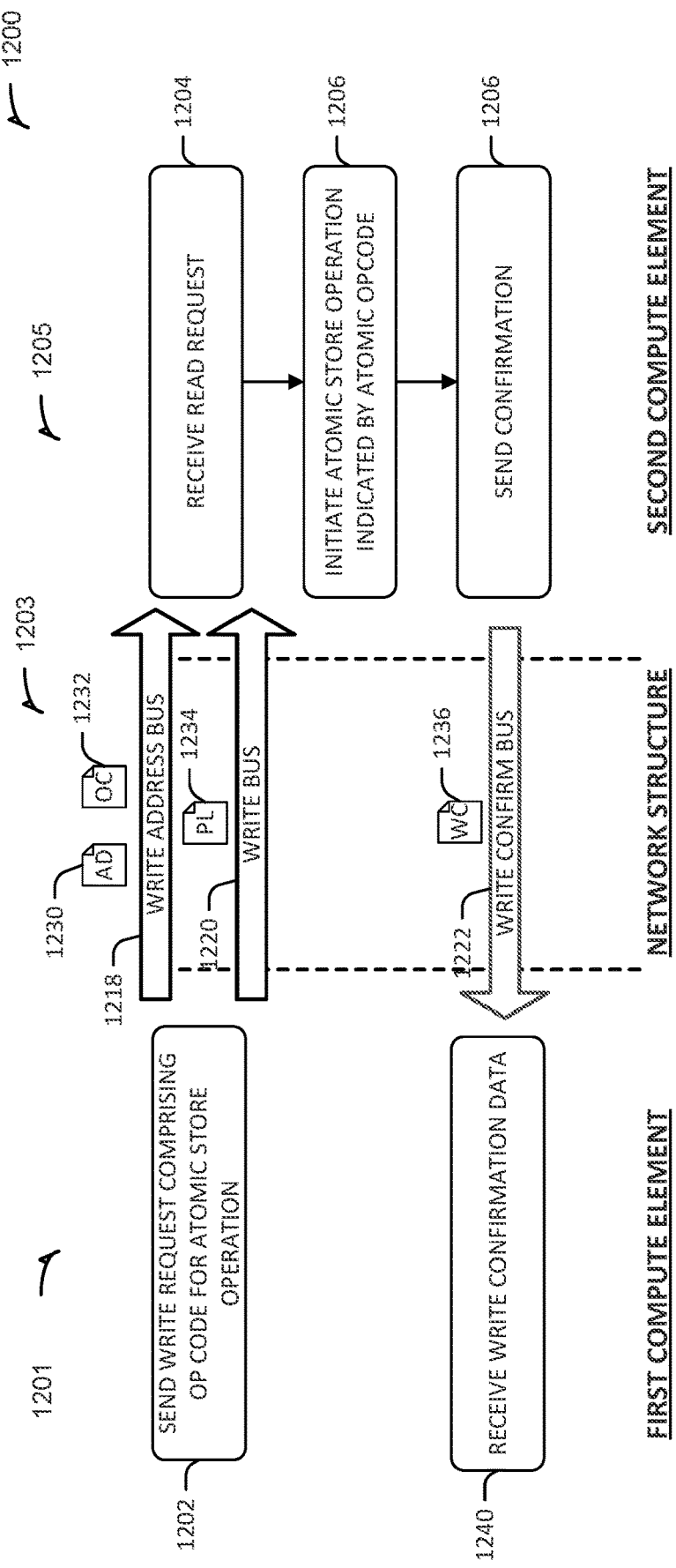
FIG. 12 is a flowchart showing one example of a process flow that may be executed, for example, in the environment of FIG. 11 to send an atomic operation request from a first compute element to a second compute element.

FIG. 12 is a flowchart showing one example of a process flow 1200 that may be executed, for example, in the environment 1100 of FIG. 11 to send an atomic operation request from a first compute element to a second compute element. The process flow 1200 includes three columns 1201, 1203, 1205. The column 1201 comprises operations that are executed by a first hardware compute element, which may be a requestor compute element similar to the requestor compute element 1102 of FIG. 11. The column 1203 includes operations executed by a network structure. The column 1205 includes operations executed by a second hardware compute element, which may be a responder compute element similar to the responder compute element 1104 of FIG. 11.

At operation 1202, the first compute element sends a write request to the second compute element via the network structure. Sending the write request may comprise sending control data including atomic address data 1230 and atomic opcode data 1232. The atomic address data 1230 and atomic opcode data 1232 may be sent to the second compute element via a write address bus 1218 provided by the network structure. The network structure may provide the write address bus 1218, for example, in response to the atomic address data 1230 and/or atomic opcode data 1232 being loaded to a write address channel (e.g., write address channel 1106). Sending the write request at operation 1202 may also include sending request data 1234 via a write data bus 1220 provided by the network structure. Some or all of the request data 1234 may be intended for storage at and/or under the management of the responder compute element 1104.

The atomic address data 1230 may indicate an address or other identifier of the second compute element. In some examples, the atomic address data 1230 may also indicate a memory location where all or a portion of the request data 1234 is to be stored. The atomic opcode data 1232 may indicate an atomic operation, such as an atomic store operation, that is to be performed and/or managed by the second compute element.

The second compute element receives the write request at operation 1204. At operation 1206, the second compute element initiates execution of the atomic operation indicated by the atomic opcode data 1232. In the example of FIG. 12, the atomic opcode data 1230 indicates an atomic store operation. The atomic store operation may involve storing all or part of the request data 1234 to a memory location. In some example, the memory location may be indicated by the atomic address data 1230. Initiating executing of the atomic operation may include, for example, executing the atomic operation at the second compute element and/or instructing or requesting that a different memory device and/or a different compute element execute the atomic operation.

At operation 1206, the second compute element sends write confirmation data 1236 to the first compute element, for example, via a write confirmation bus 1222, provided by the network structure. The first compute element may receive the write confirmation data at operation 1240. In some examples, the write confirmation data 1236 is sent after the requested atomic operation is executed and may serve as a confirmation to the first compute element that the requested atomic operation was executed and is completed. In this example, the confirmation data 1236 may serve as confirmation that the atomic operation request has been received by the second compute element.

Figure 13:
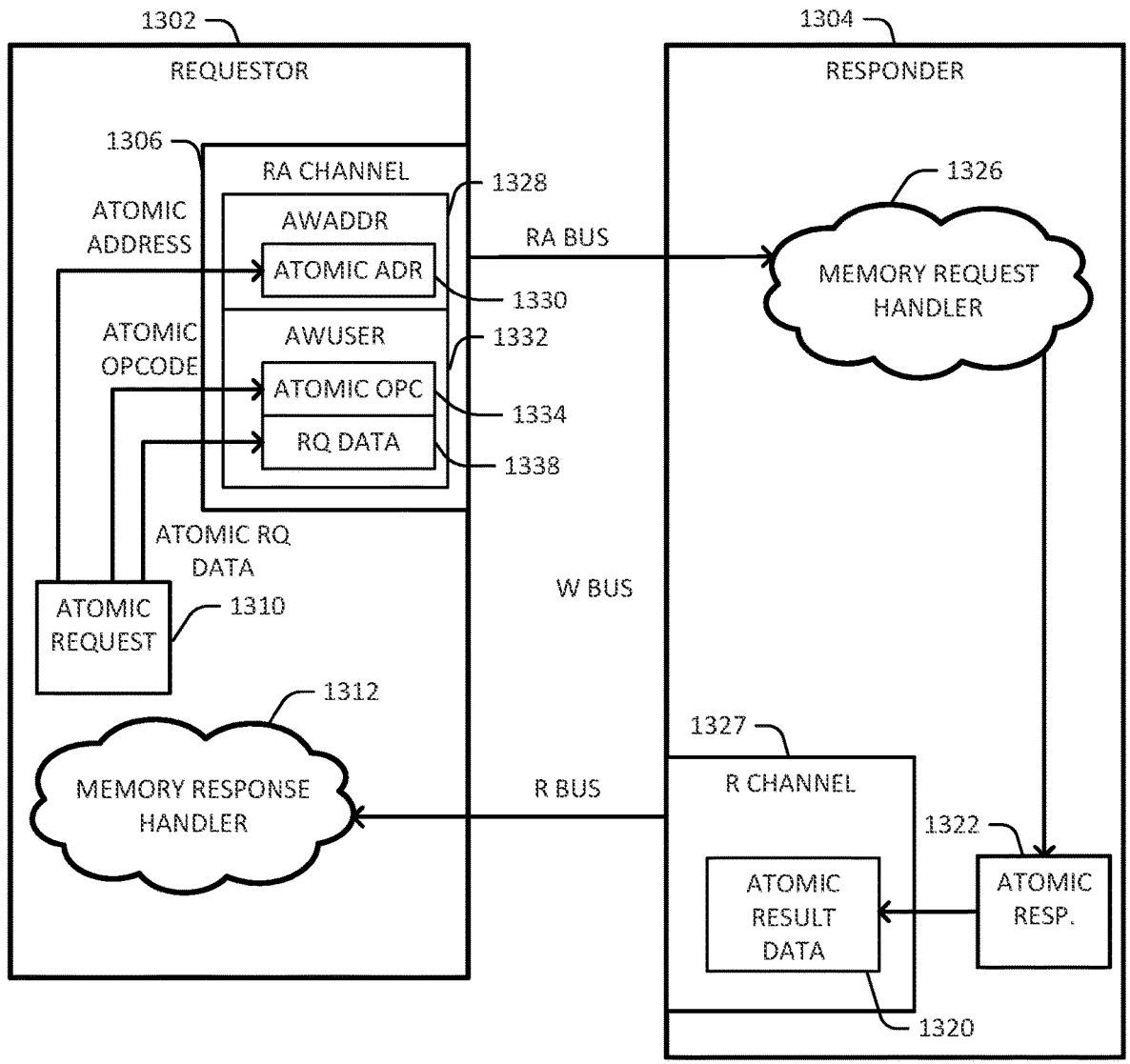
FIG. 13 is a diagram showing another example of an environment that may be implemented in a CNM system, such as the CNM system of FIG. 1, to send an atomic operation request from a requestor compute element to a responder hardware compute element.

FIG. 13 is a diagram showing one example of an environment 1300 that may be implemented in a CNM system, such as the CNM system of FIG. 1, to send an atomic operation request from a requestor compute element 1302 to a responder hardware compute element 1304. In the example transaction illustrated by FIG. 13, the requestor compute element 1302 sends an atomic operation request using a read request and corresponding busses, such as the read address bus (RA BUS) and read data bus (R BUS) described herein with respect to FIG. 9. The requestor compute element 1302 sends the read request to the responder compute element 1304. For example, a network structure may provide a read address bus (RA BUS) from the requestor compute element 1302 to the responder compute element 1304.

In an example, the atomic operation requested using the read request arrangement shown in FIG. 13 may be an atomic load operation. An atomic load operation may involve loading data that is stored at a memory location, which may be referred to as old data. In some examples, an atomic load involves returning the old data to the requestor compute element 1302. Some atomic load operations, such as an atomic increment, involve modifying the old data. In an example atomic increment, old data from a memory location is loaded and incremented with the result then stored back to the memory location in an atomic manner. In some examples, the old data and/or the incremented data is returned to the requestor compute element 1302. Another example atomic load operation may involve performing an operation on the old data structure and writing the result back to the memory location. The old data unit and/or the result of the operation may be provided back to the requestor compute element 1302.

In the example of FIG. 13, the requestor compute element 1302 comprises a read address channel 1306. The responder compute element 1304 comprises a read data channel 1327. Channels 1306, 1327 may be data paths including, for example, wires, busses, registers, and/or other similar hardware arranged to transmit data across one or more busses provided by a network structure, as described herein. It will be appreciated that the requestor compute element 1302 and/or responder compute element 1304 may comprise additional channels that are not shown in FIG. 13.

The hardware compute element 1302 comprises an atomic request circuit 1310 and a memory response handler 1312. The atomic request circuit 1310 may be configured to load control data to the read address channel 1306 for transmission to the responder compute element 1304. The memory response handler 1312 may receive atomic result data 1320 from the responder compute element 1304, as described herein. The atomic request circuit 1310 and memory response handler 1312 may be or include dedicated hardware at the respective compute elements 1302, 1304 such as, for example, registers, microcontrollers, memory, and/or the like. In some examples, the atomic request circuit 1310 and/or memory response handler 1312 may be or include software executed by a processor, microcontroller, and/or other component of the requestor compute element 1302.

The responder compute element may include a memory request handler 1326 and an atomic response circuit 1322. The memory request handler 1326 may be configured to handle incoming requests for atomic operations. For example, the memory request handler 1326 may receive data describing an incoming atomic operation request from the requestor compute element 1302 and prompt execution of the requested atomic operation at the responder compute element 1304 and/or at another compute element. The atomic response circuit 1322 may be configured to load atomic result data 1320 to the read data channel 1327 of the responder compute element 1304 for transmission to the requestor compute element 1302 via a read data bus (R BUS) provided by the network structure. The atomic response circuit 1322 and memory request handler 1326 may be or include dedicated hardware at the responder compute element 1304 such as, for example, registers, microcontrollers, memory, and/or the like. In some examples, the atomic response circuit 1322 and/or memory request handler 1326 may be or include software executed by a processor, microcontroller, and/or other component of the responder compute element 1304 to handle multiple-request transactions as described herein.

The requestor compute element 1302 may initiate the atomic operation request. For example, the atomic request circuit 1310 may load control data to the read address channel 1306. The control data may include atomic address data 1330 and atomic opcode data 1338. In some examples, the control data also includes atomic request data 1338. In an example, the atomic request circuit 1310 loads the control data to different subchannels of the read address channel 1306. For example, an address subchannel 1328 may receive the atomic address data 1330. In some examples in which an AXI protocol is used, the address subchannel may correspond to the AWADDR subchannel on the read address bus. The request data may load the atomic opcode data 1334 to a subchannel 1332. In some examples in which the AXI protocol is used, the subchannel 1332 may correspond to the AWUSER subchannel on the read address bus.

The atomic address data 1330 may comprise an address or other indicator of a compute element that is to execute the requested atomic operation. The compute element that is to handle the requested atomic operation may be the responder compute element 1304 and/or a different hardware compute element. For example, the responder compute element may be a hardware balancer compute element and may be configured to direct the atomic operation request to another compute element for execution. In some examples, the atomic address data 1330 may indicate a memory location or memory locations that are for use in the atomic transaction. For example, in an atomic load operation, the atomic address data 1330 may indicate the data unit to be loaded, for example, using an address or other indicator of a memory location where the data unit is stored. The atomic opcode data 1334 may indicate the requested atomic operation. Different atomic opcodes may correspond to different requested atomic operations. In the example of FIG. 13, the atomic opcode data 1334 may correspond to an atomic load type operation.

In some examples, the control data loaded to the read address channel may also include atomic request data 1338. The atomic request data 1338 may be included, for example, for atomic operations that involve performing an operation on a loaded data unit. The atomic request data 1338 may indicate an operation and/or provide an operand for the operation. Consider an example atomic load operation in which a data unit is loaded from a memory location, added to a number X, and then written back to the memory location. The atomic request data 1338 may, for example, include the number X. In some examples, the atomic request data 1338 is also written to the subchannel 1332.

The requestor compute element 1302 may indicate to a network structure that intends to send the atomic operation request, for example, as a read request. In some examples, the network structure provides the read address bus RA BUS when the atomic request circuit 1310 loads the data 1330, 1334, and/or 1338 to the respective subchannels 1328, 1332. When the network structure detects that data is present at the read address channel 1306, it may switch to a state that provides the read address bus RA BUS between the requestor compute element 1302 and responder compute element 1304. The requestor compute element 1302 may send the data 1330, 1334, and/or 1338 to the responder compute element 1304 via the read address bus RA BUS.

At the responder compute element 1304, the memory request handler 1326 may receive the atomic address data 1330, atomic opcode data 1334 and, optionally, the atomic request data 1338. The memory request handler 1326 may be configured to recognize the presence of the atomic opcode data 1334 and, thereby, recognize that the requestor compute element 1302 is making an atomic operation request rather than a non-atomic read request. In response, the memory request handler 1326 may prompt execution of the requested atomic operation.

In some examples, the memory request handler 1326 may prompt execution of the requested atomic operation at the responder compute element 1304. For example, the responder compute element 1304 may comprise atomic operation hardware, such as a processor, microcontroller, or other hardware that is configured to perform atomic operations. The memory request handler 1326 may load the atomic result data 1320 to a register or other memory location of the atomic operation hardware and instruct the atomic operation hardware to execute the requested atomic operation.

In other examples, the memory request handler 1326 may send a subsequent atomic operation request to another compute element, requesting that the other compute element execute the atomic operation. In some examples, the other compute element is, for example, a compute element that is nearer to the memory location where the data unit to be loaded is stored. In other examples, the other compute element is a memory controller associated with a memory device where the data unit to be loaded will be stored. The memory request handler 1326 may send the atomic operation request to the other compute element in any suitable manner. In some examples, the memory request handler 1326 (or other suitable component or components of the responder compute element 1304) make the atomic operation request to the other compute element in the same way that the requestor compute element 1302 requested the atomic operation of the responder compute element 1304.

The memory request handler 1326 may also receive result data from the atomic operation. For example, in an atomic operation that involves loading a data unit and returning the data unit to the requestor compute element, the result data may include the loaded data unit. In another example atomic operation that involves loading and incrementing a value from a memory location, the result data may include the original value at the memory location (e.g., the old data) and/or the incremented value. In an example atomic operation that involves loading a value from the memory location and performing an operation on the value, the result data may include, for example, the read value and/or the result of the operation.

The atomic response circuit 1322 may write the atomic result data 1320 to the read data channel 1327. The network structure may provide a read data bus R BUS to transmit the atomic result data to the requestor compute element 1302. The memory response handler 1312 at the requestor compute element 1302 may receive the atomic result data 1320. The receipt of the atomic result data may confirm that the requested atomic operation has been completed. In this way, the atomic result data 1320 may be confirmation data indicating to the requestor compute element 1302 that the requested atomic operation has been executed.

Figure 14:
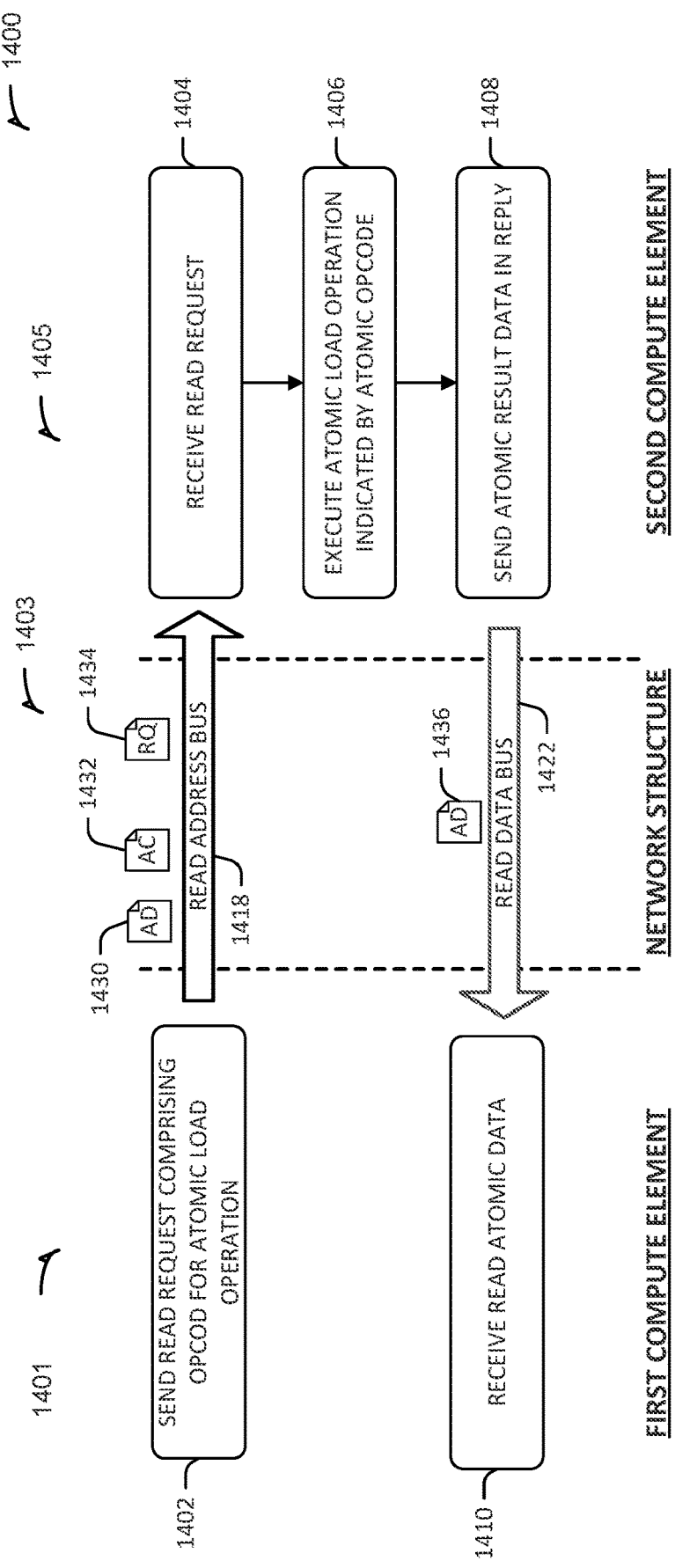
FIG. 14 is a flowchart showing one example of a process flow that may be executed, for example, in the environment of FIG. 13 to send an atomic operation request from a first compute element to a second compute element.

FIG. 14 is a flowchart showing one example of a process flow 1400 that may be executed, for example, in the environment 1300 of FIG. 13 to send an atomic operation request from a first compute element to a second compute element. The process flow 1400 includes three columns 1401, 1403, 1405. The column 1401 comprises operations that are executed by a first hardware compute element, which may be a requestor compute element similar to the requestor compute element 1302 of FIG. 13. The column 1403 includes operations executed by a network structure. The column 1405 includes operations executed by a second hardware compute element, which may be a responder compute element similar to the responder compute element 1304 of FIG. 13.

At operation 1402, the first compute element sends a read request to the second compute element via the network structure. Sending the read request may comprise sending control data including atomic address data 1430, atomic opcode data 1432, and optionally, atomic request data 1434. The control data may be sent to the second compute element via a read address bus 1418 provided by the network structure. The network structure may provide the read address bus 1418, for example, in response to the atomic address data 1430, atomic opcode data 1432 and/or atomic request data 1434 being loaded to a read address channel (e.g., read address channel 1306).

The atomic address data 1430 may indicate an address or other identifier of the second compute element. In some examples, the atomic address data 1430 may also indicate a memory location from which a data unit is to be loaded. The atomic opcode data 1432 may indicate an atomic operation, such as an atomic load operation, that is to be performed and/or managed by the second compute element. The atomic request data 1434 may describe an operation to be performed on the data unit loaded in the atomic operation and/or may include data for performing the operation, as described herein.

The second compute element receives the read request at operation 1404. At operation 1406, the second compute element initiates execution of the atomic operation indicated by the atomic opcode data 1432. In the example of FIG. 14, the atomic opcode data 1430 indicates an atomic load operation. The atomic load operation may involve loading a data unit from a memory location, e.g., a memory location indicated by the atomic address data 1430. In some atomic load operations, an additional operation is performed on the loaded data unit as described herein. Initiating executing of the atomic operation may include, for example, executing the atomic operation at the second compute element and/or instructing or requesting that a different memory device and/or a different compute element execute the atomic operation.

At operation 1408, the second compute element sends atomic result data 1436 to the first compute element via the read data bus 1422, which may be provided by the network structure. In some examples, the second compute element loads the atomic result data 1436 to a read data channel, such as the read data channel 1327 of FIG. 13. This may prompt the network structure to provide the read data bus 1422 between the second compute element and the first compute element. The first compute element may receive the atomic result data 1436 at operation 1410.

Figure 15:
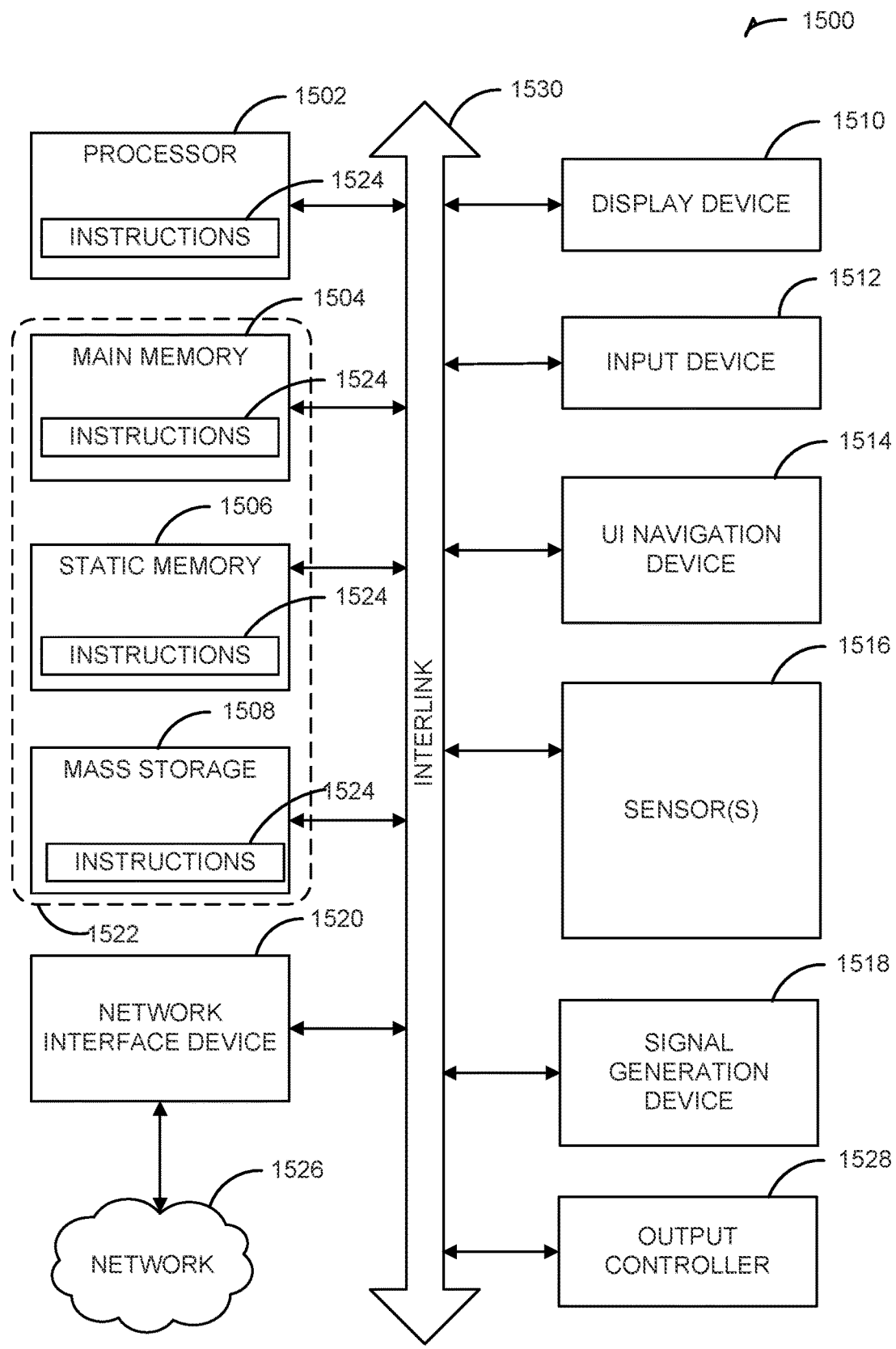
FIG. 15 illustrates a block diagram of an example machine with which, in which, or by which any one or more of the techniques (e.g., methodologies) discussed herein can be implemented.

FIG. 15 illustrates a block diagram of an example machine 1500 with which, in which, or by which any one or more of the techniques (e.g., methodologies) discussed herein can be implemented. Examples, as described herein, can include, or can operate by, logic or a number of components, or mechanisms in the machine 1500. Circuitry (e.g., processing circuitry) is a collection of circuits implemented in tangible entities of the machine 1500 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In alternative embodiments, the machine 1500 can operate as a standalone device or can be connected (e.g., networked) to other machines. In a networked deployment, the machine 1500 can operate in the capacity of a server machine, a client machine, or both in server-client network environments. In an example, the machine 1500 can act as a peer machine in peer-to-peer (P2P) (or other distributed) network environment. The machine 1500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1500 (e.g., computer system) can include a hardware processor 1502 (e.g., a central processing unit (CPU), a graphics processing unit (GPU), a hardware processor core, or any combination thereof), a main memory 1504, a static memory 1506 (e.g., memory or storage for firmware, microcode, a basic-input-output (BIOS), unified extensible firmware interface (UEFI), etc.), and mass storage device 1508 (e.g., hard drives, tape drives, flash storage, or other block devices) some or all of which can communicate with each other via an interlink 1530 (e.g., bus). The machine 1500 can further include a display device 1510, an alphanumeric input device 1512 (e.g., a keyboard), and a user interface (UI) Navigation device 1514 (e.g., a mouse). In an example, the display device 1510, the input device 1512, and the UI navigation device 1514 can be a touch screen display. The machine 1500 can additionally include a mass storage device 1508 (e.g., a drive unit), a signal generation device 1518 (e.g., a speaker), a network interface device 1520, and one or more sensor(s) 1516, such as a global positioning system (GPS) sensor, compass, accelerometer, or other sensor. The machine 1500 can include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1502, the main memory 1504, the static memory 1506, or the mass storage device 1508 can be, or include, a machine-readable media 1522 on which is stored one or more sets of data structures or instructions 1524 (e.g., software) embodying or used by any one or more of the techniques or functions described herein. The instructions 1524 can also reside, completely or at least partially, within any of registers of the hardware processor 1502, the main memory 1504, the static memory 1506, or the mass storage device 1508 during execution thereof by the machine 1500. In an example, one or any combination of the hardware processor 1502, the main memory 1504, the static memory 1506, or the mass storage device 1508 can constitute the machine-readable media 1522. While the machine-readable media 1522 is illustrated as a single medium, the term "machine-readable medium" can include a single medium or multiple media (e.g., a centralized or distributed database, or associated caches and servers) configured to store the one or more instructions 1524.

The term "machine-readable medium" can include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a set of multiple of particles having invariant (e.g., rest) mass, and thus are compositions of matter. Accordingly, non-transitory machine-readable media are machine-readable media that do not include transitory propagating signals. Specific examples of non-transitory machine-readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1522 can be representative of the instructions 1524, such as instructions 1524 themselves or a format from which the instructions 1524 can be derived. This format from which the instructions 1524 can be derived can include source code, encoded instructions (e.g., in compressed or encrypted form), packaged instructions (e.g., split into multiple packages), or the like. The information representative of the instructions 1524 in the machine-readable media 1522 can be processed by processing circuitry into the instructions to implement any of the operations discussed herein. For example, deriving the instructions 1524 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1524.

In an example, the derivation of the instructions 1524 can include assembly, compilation, or interpretation of the information (e.g., by the processing circuitry) to create the instructions 1524 from some intermediate or preprocessed format provided by the machine-readable media 1522. The information, when provided in multiple parts, can be combined, unpacked, and modified to create the instructions 1524. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1524 can be further transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1520 can include one or more physical jacks (e.g., Ethernet, coaxial, or phone jacks) or one or more antennas to connect to the network 1526. In an example, the network interface device 1520 can include a set of multiple of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software. A transmission medium is a machine-readable medium.

To better illustrate the methods and apparatuses described herein, a non-limiting set of example embodiments are set forth below as numerically identified examples.

Example 1 is a computing system comprising: a first hardware compute element; a second hardware compute element; and a network structure, the computing system being configured to perform operations comprising: sending, by a first hardware compute element, a first request via a network structure, the first request comprising an atomic opcode indicating an atomic operation to be performed by a second hardware compute element; providing, by the network structure, an address bus from the first hardware compute element for providing the atomic opcode to the second hardware compute element; executing, by the second hardware compute element, the atomic operation; sending, by the second hardware compute element, confirmation data indicating completion of the atomic operation; and providing, by the network structure a second bus from the second hardware compute element and the first hardware compute element, the second bus for providing the confirmation data from the second hardware compute element to the first hardware compute element.

In Example 2, the subject matter of Example 1 optionally includes the atomic operation being an atomic store operation and the first request also comprising request data to be stored by the second hardware compute element, the operations further comprising: providing, by the network structure, a first request data bus from the first hardware compute element for providing the request data to the second hardware compute element; and the second bus being a write confirmation bus.

In Example 3, the subject matter of Example 2 optionally includes the address bus comprising a first channel for providing the atomic opcode and a second channel for providing address data indicating the second hardware compute element.

In Example 4, the subject matter of any one or more of Examples 1-3 optionally includes the atomic operation being an atomic load operation, the first request comprising a data identifier describing data to be loaded.

In Example 5, the subject matter of Example 4 optionally includes the second bus being a read data bus and the confirmation data comprising read data indicated by the data identifier.

In Example 6, the subject matter of any one or more of Examples 4-5 optionally includes the first request further comprising operation data, the atomic opcode describing an operation that is based on the data to be loaded and the operation data.

In Example 7, the subject matter of Example 6 optionally includes the address bus comprising a first channel for providing the atomic opcode, a second channel for providing the data identifier, and a third channel for providing the operation data.

In Example 8, the subject matter of any one or more of Examples 1-7 optionally includes the first request also comprising: sending, by the first hardware compute element, the first request to a hardware load balancer element; and sending a second request, by the hardware load balancer element, to the second hardware compute element, the second request comprising the atomic opcode.

In Example 9, the subject matter of any one or more of Examples 1-8 optionally includes the address bus being provided between the first hardware compute element and the second hardware compute element.

Example 10 is a method of requesting an atomic operation between compute elements of a computing system, the method comprising: sending, by a first hardware compute element, a first request via a network structure, the first request comprising an atomic opcode indicating an atomic operation to be performed by a second hardware compute element; providing, by the network structure, an address bus from the first hardware compute element for providing the atomic opcode to the second hardware compute element; executing, by the second hardware compute element, the atomic operation; sending, by the second hardware compute element, confirmation data indicating completion of the atomic operation; and providing, by the network structure a second bus from the second hardware compute element and the first hardware compute element, the second bus for providing the confirmation data from the second hardware compute element to the first hardware compute element.

In Example 11, the subject matter of Example 10 optionally includes the atomic operation being an atomic store operation and the first request also comprising request data to be stored by the second hardware compute element, the method further comprising: providing, by the network structure, a first request data bus from the first hardware compute element for providing the request data to the second hardware compute element; and the second bus being a write confirmation bus.

In Example 12, the subject matter of Example 11 optionally includes the address bus comprising a first channel for providing the atomic opcode and a second channel for providing address data indicating the second hardware compute element.

In Example 13, the subject matter of any one or more of Examples 10-12 optionally includes the atomic operation being an atomic load operation, the first request comprising a data identifier describing data to be loaded.

In Example 14, the subject matter of Example 13 optionally includes the second bus being a read data bus and the confirmation data comprising read data indicated by the data identifier.

In Example 15, the subject matter of any one or more of Examples 13-14 optionally includes the first request further comprising operation data, the atomic opcode describing an operation that is based on the data to be loaded and the operation data.

In Example 16, the subject matter of Example 15 optionally includes the address bus comprising a first channel for providing the atomic opcode, a second channel for providing the data identifier, and a third channel for providing the operation data.

In Example 17, the subject matter of any one or more of Examples 10-16 optionally includes the first request also comprising: sending, by the first hardware compute element, the first request to a hardware load balancer element; and sending a second request, by the hardware load balancer element, to the second hardware compute element, the second request comprising the atomic opcode.

In Example 18, the subject matter of any one or more of Examples 10-17 optionally includes the address bus being provided between the first hardware compute element and the second hardware compute element.

Example 19 is a non-transitory machine-readable medium comprising instructions thereon, that when executed by a system comprising a first hardware compute element, a second hardware compute element, and a network structure, cause the system to perform operations comprising: sending, by a first hardware compute element, a first request via a network structure, the first request comprising an atomic opcode indicating an atomic operation to be performed by a second hardware compute element; providing, by the network structure, an address bus from the first hardware compute element for providing the atomic opcode to the second hardware compute element; executing, by the second hardware compute element, the atomic operation; sending, by the second hardware compute element, confirmation data indicating completion of the atomic operation; and providing, by the network structure a second bus from the second hardware compute element and the first hardware compute element, the second bus for providing the confirmation data from the second hardware compute element to the first hardware compute element.

In Example 20, the subject matter of Example 19 optionally includes the atomic operation being an atomic store operation and the first request also comprising request data to be stored by the second hardware compute element, the operations further comprising: providing, by the network structure, a first request data bus from the first hardware compute element for providing the request data to the second hardware compute element; and the second bus being a write confirmation bus.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computing system comprising:
   a first hardware compute element;
   a second hardware compute element; and
   a network structure, the computing system being configured to perform operations comprising:
   sending, by a first hardware compute element, a first request via a network structure, the first request comprising an atomic opcode indicating an atomic operation to be performed by a second hardware compute element;
   providing, by the network structure, an address bus from the first hardware compute element for providing the atomic opcode to the second hardware compute element;
   executing, by the second hardware compute element, the atomic operation;
   sending, by the second hardware compute element, confirmation data indicating completion of the atomic operation; and
   providing, by the network structure a second bus from the second hardware compute element and the first hardware compute element, the second bus for providing the confirmation data from the second hardware compute element to the first hardware compute element.

2. The computing system of claim 1, the atomic operation being an atomic store operation and the first request also comprising request data to be stored by the second hardware compute element, the operations further comprising:

providing, by the network structure, a first request data bus from the first hardware compute element for providing the request data to the second hardware compute element; and the second bus being a write confirmation bus.

3. The computing system of claim 2, the address bus comprising a first channel for providing the atomic opcode and a second channel for providing address data indicating the second hardware compute element.

4. The computing system of claim 1, the atomic operation being an atomic load operation, the first request comprising a data identifier describing data to be loaded.

5. The computing system of claim 4, the second bus being a read data bus and the confirmation data comprising read data indicated by the data identifier.

6. The computing system of claim 4, the first request further comprising operation data, the atomic opcode describing an operation that is based on the data to be loaded and the operation data.

7. The computing system of claim 6, the address bus comprising a first channel for providing the atomic opcode, a second channel for providing the data identifier, and a third channel for providing the operation data.

8. The computing system of claim 1, the first request also comprising:

sending, by the first hardware compute element, the first request to a hardware load balancer element; and sending a second request, by the hardware load balancer element, to the second hardware compute element, the second request comprising the atomic opcode.

9. The computing system of claim 1, the address bus being provided between the first hardware compute element and the second hardware compute element.

10. A method of requesting an atomic operation between compute elements of a computing system, the method comprising:

sending, by a first hardware compute element, a first request via a network structure, the first request comprising an atomic opcode indicating an atomic operation to be performed by a second hardware compute element;

providing, by the network structure, an address bus from the first hardware compute element for providing the atomic opcode to the second hardware compute element;

executing, by the second hardware compute element, the atomic operation;

sending, by the second hardware compute element, confirmation data indicating completion of the atomic operation; and providing, by the network structure a second bus from the second hardware compute element and the first hardware compute element, the second bus for providing the confirmation data from the second hardware compute element to the first hardware compute element.

11. The method of claim 10, the atomic operation being an atomic store operation and the first request also comprising request data to be stored by the second hardware compute element, the method further comprising:

providing, by the network structure, a first request data bus from the first hardware compute element for providing the request data to the second hardware compute element; and the second bus being a write confirmation bus.

12. The method of claim 11, the address bus comprising a first channel for providing the atomic opcode and a second channel for providing address data indicating the second hardware compute element.

13. The method of claim 10, the atomic operation being an atomic load operation, the first request comprising a data identifier describing data to be loaded.

14. The method of claim 13, the second bus being a read data bus and the confirmation data comprising read data indicated by the data identifier.

15. The method of claim 13, the first request further comprising operation data, the atomic opcode describing an operation that is based on the data to be loaded and the operation data.

16. The method of claim 15, the address bus comprising a first channel for providing the atomic opcode, a second channel for providing the data identifier, and a third channel for providing the operation data.

17. The method of claim 10, the first request also comprising:

sending, by the first hardware compute element, the first request to a hardware load balancer element; and sending a second request, by the hardware load balancer element, to the second hardware compute element, the second request comprising the atomic opcode.

18. The method of claim 10, the address bus being provided between the first hardware compute element and the second hardware compute element.

19. A non-transitory machine-readable medium comprising instructions thereon, that when executed by a system comprising a first hardware compute element, a second hardware compute element, and a network structure, cause the system to perform operations comprising:

sending, by a first hardware compute element, a first request via a network structure, the first request comprising an atomic opcode indicating an atomic operation to be performed by a second hardware compute element;

providing, by the network structure, an address bus from the first hardware compute element for providing the atomic opcode to the second hardware compute element;

executing, by the second hardware compute element, the atomic operation;

sending, by the second hardware compute element, confirmation data indicating completion of the atomic operation; and providing, by the network structure a second bus from the second hardware compute element and the first hardware compute element, the second bus for providing the confirmation data from the second hardware compute element to the first hardware compute element.

20. The medium of claim 19, the atomic operation being an atomic store operation and the first request also comprising request data to be stored by the second hardware compute element, the operations further comprising:

providing, by the network structure, a first request data bus from the first hardware compute element for providing the request data to the second hardware compute element; and the second bus being a write confirmation bus.

* * * * *